United States Patent
Carroll et al.

(10) Patent No.: US 9,459,927 B2
(45) Date of Patent: Oct. 4, 2016

(54) CENTRAL OFFICE BASED VIRTUAL PERSONAL COMPUTER

(75) Inventors: Martin D. Carroll, Watchung, NJ (US); Hungkei Keith Chow, Livingston, NJ (US); Ilija Hadzic, Millington, NJ (US); Ronald L. Sharp, Clinton, NJ (US); Theodore Sizer, II, Little Silver, NJ (US); Dusan Suvakovic, Marina del Rey, CA (US); Doutje T. Van Veen, New Providence, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 2306 days.

(21) Appl. No.: 12/125,315

(22) Filed: May 22, 2008

(65) Prior Publication Data

US 2009/0293055 A1   Nov. 26, 2009

(51) Int. Cl.
G06F 9/455 (2006.01)
G06F 9/50 (2006.01)
G06F 9/48 (2006.01)

(52) U.S. Cl.
CPC ........... *G06F 9/5077* (2013.01); *G06F 9/4856* (2013.01)

(58) Field of Classification Search
None
See application file for complete search history.

(56) References Cited

U.S. PATENT DOCUMENTS

| | | | |
|---|---|---|---|
| 6,717,586 B2 * | 4/2004 | Fujiki | 345/629 |
| 7,075,939 B2 * | 7/2006 | Kalkunte et al. | 370/401 |
| 7,372,814 B1 * | 5/2008 | Chiruvolu et al. | 370/235 |
| 7,539,631 B1 * | 5/2009 | El-Haj | 705/26.1 |
| 7,577,722 B1 * | 8/2009 | Khandekar et al. | 709/220 |
| 7,606,965 B2 * | 10/2009 | Njoku et al. | 710/316 |
| 7,752,360 B2 * | 7/2010 | Galles | 710/62 |
| 2002/0171678 A1 * | 11/2002 | Bandhole et al. | 345/744 |
| 2006/0075111 A1 | 4/2006 | Auryan et al. | |
| 2006/0146057 A1 * | 7/2006 | Blythe | 345/506 |

(Continued)

FOREIGN PATENT DOCUMENTS

| | | |
|---|---|---|
| KR | 20030092693 | 12/2003 |
| WO | WO02/03220 | 1/2002 |
| WO | WO2004/025431 | 3/2004 |
| WO | WO2006/039332 | 4/2006 |

OTHER PUBLICATIONS

R.A. Baratto et al., "THINC: A Virtual Display Architecture for Thin-Client Computing," ACM, Proceedings of the Symposium on Operating System Principles, Oct. 2005, pp. 1-14.

(Continued)

*Primary Examiner* — Gregory A Kessler
(74) *Attorney, Agent, or Firm* — Ryan, Mason & Lewis, LLP

(57) ABSTRACT

A virtual personal computer is implemented in a communication system comprising a plurality of central offices each of which communicates with a plurality of client devices over a corresponding access network. A given one of the central offices comprises at least one compute server and at least one storage server. The virtual personal computer is configured by allocating physical processing resources of the compute server and physical storage resources of the storage server to that virtual personal computer. User access is provided to the virtual personal computer via one of the client devices. The virtual personal computer can be dynamically reconfigured by altering the allocation of at least one of the physical processing resources and the physical storage resources to the given virtual personal computer responsive to particular applications selected by the user to run on the given virtual personal computer.

21 Claims, 12 Drawing Sheets

(56) References Cited

U.S. PATENT DOCUMENTS

2007/0180450 A1* 8/2007 Croft et al. .................. 718/1
2008/0201479 A1* 8/2008 Husain et al. ............. 709/227
2008/0205518 A1* 8/2008 Wilinski et al. ......... 375/240.08

OTHER PUBLICATIONS

B.O. Christiansen et al., "Fast Motion Detection for Thin Client Compression," IEEE, Proceedings of the Data Compression Conference, Apr. 2002, pp. 332-341.

B.O. Christiansen et al., "Streaming Thin Client Compression," IEEE, Proceedings of the Data Compression Conference, Mar. 2001, pp. 223-232.

D. De Winter et al., "A Hybrid Thin-Client Protocol for Multimedia Streaming and Interactive Gaming Applications," ACM, 16th International Workshop on Network and Operating Systems Support for Digital Audio and Video, May 2006, pp. 86-92.

M. Satyanarayanan et al., "Pervasive Personal Computing in an Internet Suspend/Resume System," IEEE Internet Computing, Apr. 2007, pp. 16-25.

* cited by examiner

CENTRAL OFFICE BASED VIRTUAL PERSONAL COMPUTER

FIELD OF THE INVENTION

The present invention relates generally to the field of computers, and more particularly to personal computers (PCs) that are implemented in a virtual manner within a communication system.

BACKGROUND OF THE INVENTION

Conventional PCs clearly provide significant benefits to their users. For example, PCs can run an open-ended set of applications, provide access to the Internet, and support email and other information sharing arrangements. Also, PCs typically have a crisp interactive responsiveness. In spite of these benefits, however, the current state of PC technology leaves much room for improvement. For example, significant drawbacks exist in the areas of security, hardware, access, administration, and energy.

With regard to security, PCs and the operating systems that typically run on them are often insecure. They get infected with viruses, worms, and spyware. Criminals may break into them to steal personal information and CPU cycles. In the worst case, the entire physical PC itself can be stolen.

PC hardware also presents several difficulties. First, hardware can have a high failure rate. When a part fails, it is typically thrown away and manually replaced. If the broken part is a disk drive, then important data may be lost. Current techniques for PC backup on remote storage servers are slow, unreliable, and complicated to administer—hence many users rarely, if ever, back up their data.

Second, even when hardware does not break, it often needs to be replaced. By way of example, new applications and new versions of the operating system might require more memory, more disk space, or faster processors; a new game might require a new video card, which in turn might require a new power supply or motherboard; a higher-definition video standard might require a new optical drive and display. To accommodate the ever increasing demands that software places on hardware, many users are reduced to replacing their entire PC every few years.

Third, when hardware does break or needs to be replaced, the act of replacing can be anywhere from inconvenient to impossible. Many users are simply not skilled enough to open a PC and replace components—if they can even figure out what needs replacing in the first place. Even an experienced user will concede defeat and simply buy a new PC if the item that needs replacing is the motherboard.

With regard to remote access, current remote-access solutions perform poorly—if at all—when the remote machine is displaying motion video, or when isochronous peripherals, such as USB microphones, are remotely connected. In general, a remotely accessed machine often does not behave like a local machine. This difference between the local and remote experience frustrates attempts to travel and telecommute. Further, current remote-access solutions usually do not work at all if the remote PC is broken.

In terms of administration, PCs are nontrivial to administer, even for an expert. Most users do not have the skill required to administer a PC correctly, and most probably do not even try.

Finally, with regard to energy, PCs consume a lot of power. Most PCs are left turned on when not in use, and a very large number of PCs are underutilized even when they are being used. Having vast numbers of users each equipped with an underutilized, never-turned-off PC is extremely wasteful of energy. And having those PCs regularly end up in landfills is destructive of the environment.

Accordingly, a need exists for improved PC technology.

SUMMARY OF THE INVENTION

The present invention in one or more illustrative embodiments provides virtual PCs (VPCs) that are based in a central office (CO) of a communication system and overcome one of more of the above-described drawbacks of conventional PCs.

In one aspect of the invention, a VPC is implemented in a communication system comprising a plurality of COs, each of which communicates with client devices over a corresponding access network. A given one of the COs comprises at least one compute server and at least one storage server. The VPC is configured by allocating physical processing resources of the compute server and physical storage resources of the storage server to that VPC. User access is provided to the VPC via one of the client devices, which may be a thin client (TC). The VPC can be dynamically reconfigured by altering the allocation of at least one of the physical processing resources and the physical storage resources to the given VPC responsive to particular applications selected by the user to run on the given VPC.

In an illustrative embodiment, the given VPC can be migrated from the given CO to another CO responsive to the user attempting to access the VPC from a client device served by the other CO. This migration may be implemented, for example, by communicating virtual machine and virtual disk drive information characterizing the VPC from the given CO to the other CO over a back-end network that interconnects the COs.

The illustrative embodiments retain the benefits of conventional PCs while also solving one or more of the above-noted problems of security, hardware, access, administration, and energy. For example, a given CO-based VPC configured in accordance with an illustrative embodiment has all the advantages of a conventional PC, including the same crisp interactive responsiveness. This is because the VPC executes within the CO, which is sufficiently close to the user to enable the system to deliver responsiveness comparable to that of a conventional PC. Moreover, the VPC is able to run the same open-ended set of applications as a conventional PC. Applications do not have to be recoded or even recompiled to run on it, since the VPC can run any conventional PC operating system. The VPC is more secure than a conventional PC, and its associated hardware rarely breaks or becomes obsolete. Also, the VPC is universally accessible from any location in which a TC can establish a connection with a CO. Furthermore, the VPC does not have to be administered by the user, and it is substantially "greener" in terms of its impact on the environment than the conventional PC that it replaces.

These and other features and advantages of the present invention will become more apparent from the accompanying drawings and the following detailed description.

DETAILED DESCRIPTION OF THE INVENTION

The present invention will be illustrated below in conjunction with exemplary CO-based VPCs implemented in a communication system. It should be understood, however, that the invention is not limited to use with the particular types of communication systems or VPC components and features disclosed. The invention can be implemented in a wide variety of other types of communication systems, and in numerous alternative VPC configurations. For example, although illustrated below in the context of particular CO-based systems, the disclosed techniques can be adapted in a straightforward manner to other types of wired or wireless communication systems, including cellular systems, multiple-input multiple-output (MIMO) systems, Wi-Fi or WiMax systems, cable systems, etc.

The terms "central office" or CO as used herein are intended to include without limitation a CO of an Ethernet over passive optical network (EPON) communication system, a Gigabit passive optical network (GPON) communication system, a digital subscriber line (DSL) communication system, a digital cable communication system, a WiMax cellular system or other type of wireline or wireless communication system. In such systems, the CO is the system entity that couples to customer premises equipment (CPE) via an access network. It is also expected that the invention can be implemented in higher bandwidth evolutions of such systems, or more generally in any communication system capable of providing sufficient bandwidth to support VPCs as described herein.

Figure 1:
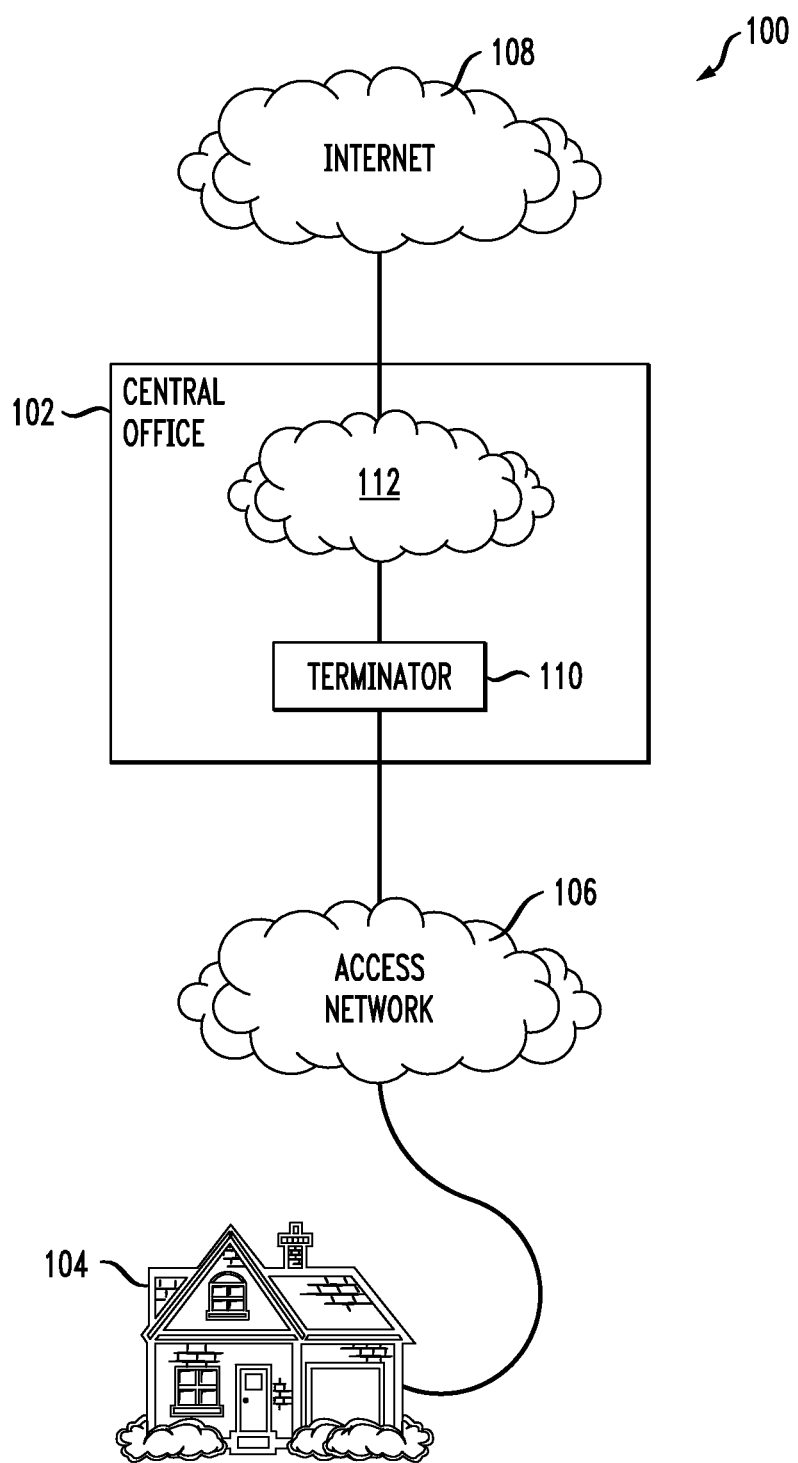
FIGS. 1 through 4 are block diagrams showing different aspects of a communication system configured to implement CO-based VPCs in an illustrative embodiment of the invention.

FIG. 1 shows a communication system 100 comprising a CO 102 coupled to a user location 104 via an access network 106. The CO is also coupled to the Internet 108. The user location 104 may be, for example, a residence or an enterprise. Associated with the user location 104 is at least one communication device referred to herein as a thin client (TC), which is not explicitly shown in this particular system view. Such a TC may comprise, for example, a computer terminal or other communication device having minimal memory and processing resources, and may connect to the access network 106 via conventional CPE, such as a modem or other type of network interface circuitry.

The CO 102 as shown in this view comprises a termination unit 110, which may comprise, for example, at least a portion of a optical line terminator (OLT) of a EPON or GPON system. As another example, termination unit 110 may comprise a DSL access multiplexer (DSLAM). Additional processing elements 112 of the CO 102 may comprise, for example, compute servers and storage servers, which are utilized to implement VPCs in the system 100 in a manner to be described in greater detail below. The system 100 may be under the control of a given service provider (SP) that provides VPCs to its users.

A given VPC provided by the system 100 is dynamically reconfigurable and can be made universally accessible from any TC at any user location having a connection to a given CO. As will become apparent, a VPC implemented as disclosed herein advantageously overcomes the significant drawbacks of conventional PCs in the above-described areas of security, hardware, access, administration, and energy.

A single CO 102 within the system 100 can serve thousands of subscribers, many or all of whom may want to run several simultaneously executing VPCs, for example, one for each family member. Also, a given user who travels into an area serviced by another CO will be able to access his or her VPC at that remote location without any degradation in performance, regardless of the distance from the home CO. Thus, system 100 may comprise a large number of COs that are geographically remote from one another.

Figure 2:
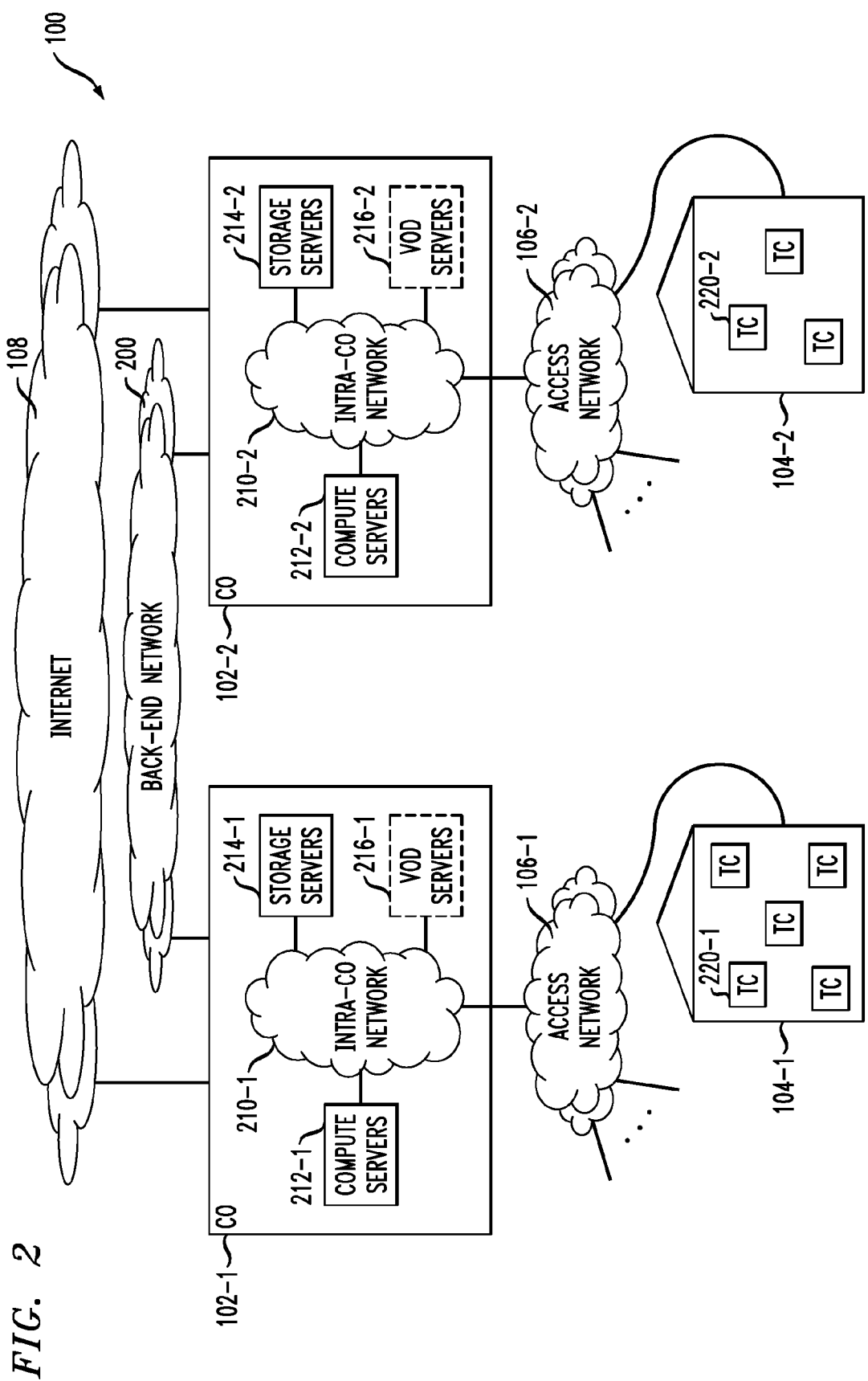

FIG. 2 shows another view of the system 100 in which two COs denoted 102-1 and 102-2 can be seen. Each of the COs 102 is coupled to the Internet 108. The COs 102 are also configured to communicate with one another via a back-end inter-CO network 200. The back-end network 200 may alternatively be implemented within Internet 108, rather than as a separate network as shown. Each of the COs 102 further includes an intra-CO network 210, as well as compute servers 212, storage servers 214 and optional video-on-demand (VOD) servers 216, which are coupled to the intra-CO network 210. The intra-CO networks 210-1 and 210-2 of the COs 102-1 and 102-2 are coupled via respective access networks 106-1 and 106-2 to respective user locations 104-1 and 104-2. Each of the user locations has multiple TCs 220-1 and 220-2 associated therewith, as indicated. Also, each of the access networks 106 may interface numerous other user locations, not explicitly shown in this figure, to the respective COs 102. Each of the TCs at a given user location 104 may be used to access one or more of the VPCs supported by the system.

The compute servers 212 run virtualization software which provides execution of the VPCs. The storage servers 214 provide virtual implementation of user hard drives associated with respective VPCs. The VOD servers 216, when present, can be used to deliver high quality stored video to VPC users.

Figure 3:
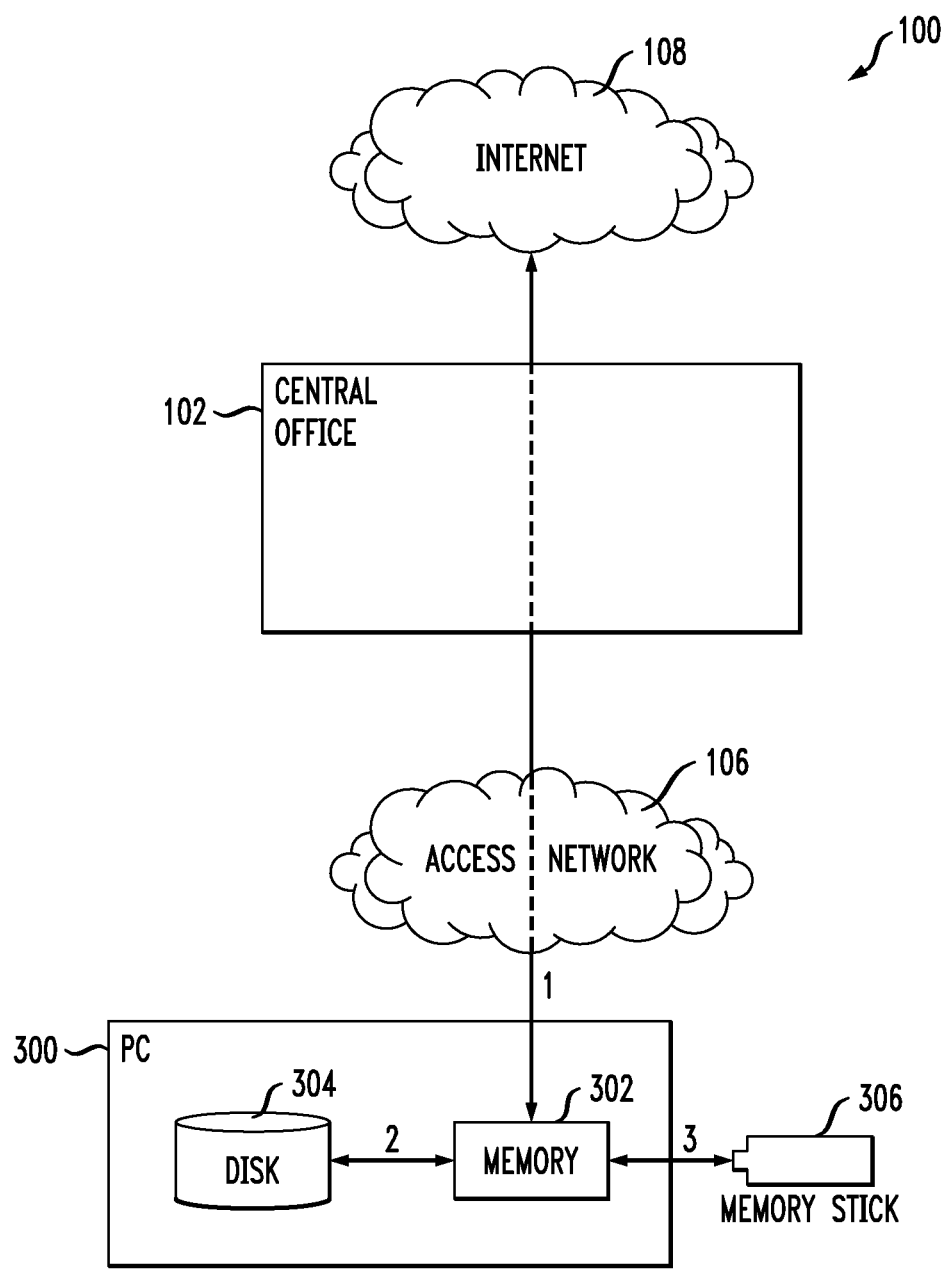

In addition to providing VPCs, the system 100 may be configured to provide access to Internet 108 for a conventional PC 300 having a memory 302, hard disk 304 and associated USB memory stick 306, as shown in FIG. 3. This aspect of the operation of system 100 may be implemented using conventional access technologies, which are well known to those skilled in the art and will therefore not be described in detail herein. Of course, the particular configuration shown is by way of illustrative example only, and the system can be configured to support numerous alternative conventional computing devices or more generally other types of processing devices.

Figure 4:
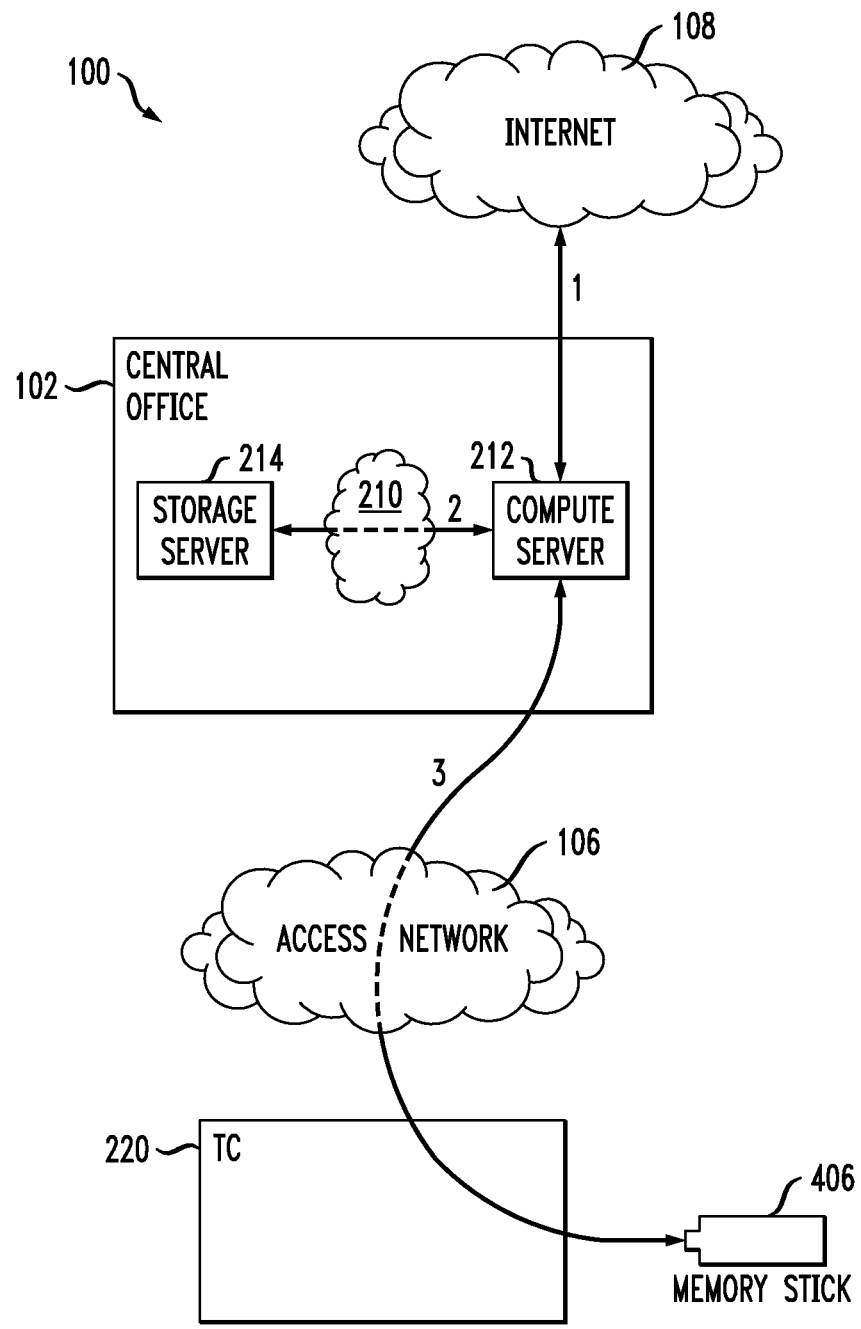

Referring now to FIG. 4, a given TC 220 having an associated USB memory stick 406 accesses the CO 102 via network 106 as shown.

The TC 220 may be any type of client device that allows a user to access a VPC of system 100. Such a device may be, for example, a computing device that does not include certain hardware or software that is typically found on a conventional PC. As a more particular example, the TC may comprise a device having a non-Windows OS, little software, and a small, lightweight form factor. This may be a device containing the bare minimum amount of software and hardware needed to support interaction with the CO. Again, the particular configuration shown in FIG. 4 should be viewed as just one example of such a device.

When the user initially logs onto the system 100 from a given TC, his or her VPC is instantiated on the compute and storage servers 212, 214 located in the particular CO 102 serving that TC. The TC then presents the VPC to the user, to whom that VPC will look and feel just like a conventional PC.

It should be noted that embodiments of the present invention may be implemented at least in part in the form of one or more software programs that are stored in a memory or other processor-readable medium of one or more servers or other processing element of the system 100. Of course, a wide variety of alternative arrangements of hardware, software or firmware in any combination may be utilized in implementing various elements of system 100.

Properties

The system 100 provides a VPC architecture that retains the benefits of conventional PCs while also solving one or more of the problems of security, hardware, access, administration, and energy. A given CO-based VPC implemented in system 100 appears to its user as having the properties outlined below.

The VPC has all the advantages of a conventional PC. In particular, it has the same crisp interactive responsiveness as is found in most conventional PCs. This is because the VPC executes within the CO, which is sufficiently close to the user to enable the system to deliver responsiveness comparable to that of a conventional PC. Moreover, the VPC is able to run the same open-ended set of applications as a conventional PC. Applications do not have to be recoded or even recompiled to run on it, since the VPC can run any conventional PC operating system.

The VPC is more secure than a conventional PC. It is less likely to get infected by any form of malware, or to be broken into or stolen. This is also a result of the fact that the VPC executes within the CO. A SP can help secure the VPC by setting up firewalls and other protective mechanisms around the compute and storage servers. Many users of conventional PCs do not have the skill, time, or desire required to set up and manage the equivalent level of protection. Also, a TC is much easier to implement in a secure fashion than a conventional PC. Further, the TC is not an attractive target because it typically stores little or no user data, and has fewer CPU cycles to steal than a conventional PC. Of course, a VPC cannot be physically stolen.

The hardware of the CO-based VPC rarely breaks or becomes obsolete. If a current application mix requires a certain hardware configuration, then the system may automatically reconfigure itself to that configuration. Also, users can manually reconfigure the hardware of their VPCs whenever they like, via a user interface provided for that purpose. For example, users can add memory, CPUs or other resources to their VPCs at any time via a user interface. Such users may be referred to herein as "power" users, as they are provided with a higher level of control than that needed or desired by most ordinary users. The only actual hardware that the user can physically touch is the TC, but that device will rarely if ever need replacing. In the unusual case in which the TC does need replacing, it would be much easier and less expensive to replace than a conventional PC.

The VPC is universally accessible from any location in which a TC can establish a connection with a CO, and without regard to the particular state of the VPC. For example, the system can be configured to allow a user to access his or her VPC even if the VPC is in a "crashed" state. If the user physically moves to a different TC that is served by the same CO as his or her original TC, the user instantly sees precisely the same VPC that he or she saw from the previous location. If the user moves to a TC (say, in another town) that is served by a different CO, then the system dynamically migrates the VPC to the new CO via the back-end network. After a short amount of time, the user again sees the same VPC that he or she saw before.

The user does not have to administer his or her VPC. Power users who want explicit control can administer their PC as usual, right down to being able to reconfigure the hard drive and load their own OS. This is achieved by enabling SPs to sell a range of administration services. As a result, users who do not want to perform administrative duties can pay a SP to serve that function, whereas users who want full control over their VPCs can do it all themselves.

The VPC is greener than the conventional PC that it replaces. This is achieved in several ways. First, a relatively small collection of centralized servers uses less energy than the relatively large collection of typically underutilized conventional PCs that they replace. Second, the compute servers are specially designed to perform graphics processing using less energy than conventional PCs. And third, the servers and TCs are rarely thrown away, and so the resulting total volume of servers and TCs that do wind up in landfills will be much lower than the total volume of conventional PCs that they replace.

Thus, a given illustrative embodiment of the invention clearly provides both residential and enterprise users with a significant improvement over their existing computing technology. It should be noted that other embodiments of the invention need not provide all of the advantageous features listed above. Numerous alternative combinations of these and other features are possible.

Data Paths

As indicated above, a VPC in the illustrative embodiment looks and feels to the user just like a conventional PC. It has CPUs and disk drives; it boots an operating system; it runs arbitrary applications. Although most residential users will run Windows, users can, if they wish, reconfigure their virtual hard drive and load their own favorite OS. The user of a VPC can install applications just like on a conventional PC, either via download or from a local CD/DVD drive. An application that is running on a VPC looks and feels just like an application running on a conventional PC.

Although a VPC looks and feels just like a conventional PC, the paths that data traverse in a given VPC implementation are different from the paths in a conventional PC implementation. As indicated previously, FIG. 3 illustrates the manner in which system 100 can support a conventional PC 300. Path 1 is the path that data traverses when it is transferred between the Internet 108 and the memory 302 of the PC 300—for example, when a web page is downloaded from a server in the Internet into a web browser. Path 2 is the path that data traverses when it is written or read between memory 302 and disk 304—for example, when the web browser writes a downloaded file to disk, or when a program reads a file. And path 3 is the path that data traverses when it is transferred between memory 302 and external storage, such as USB memory stick 306.

The bandwidth along path 1 in the downstream direction depends on the following things:
1) the bandwidth of the server in the Internet 108;
2) the bandwidth of the path through the Internet 108 and CO 102;

3) the bandwidth through the access network 106; and 4) the bandwidth of network, processor, and memory subsystems of PC 300.

Traditionally the bottleneck in this path is item 3. In such cases the effective bandwidth as seen by the user of PC 300 is the bandwidth of the access network 106. Hence, most users and SP ad copy implicitly equate "access-network bandwidth" with "download bandwidth."

Notice that in the FIG. 3 implementation paths 2 and 3 reside entirely below the access network 106. Hence, the bandwidths of those paths are entirely dependent on user equipment. The SP cannot do anything to improve or degrade the bandwidth of those paths.

Now consider the VPC case, as shown in FIG. 4. Notice that in the VPC case, path 1 does not traverse the access network 106. Instead, this path stops at the compute server 212 in the CO 102. Hence, in the VPC case the access network is not a bottleneck for web-page downloads (or uploads, or anything else that travels between the Internet and VPC memory). This property is very desirable. To emphasize: the VPC removes the bottleneck from the path of one of the most frequently invoked operations (web-page download) that subscribers interpret as the primary measure of the quality of their Internet connection.

In the VPC case, it is path 3 that traverses the access network 106. For example, if the user downloads a file from the Internet 108 and specifies USB memory stick 406 as the destination, then the entire contents of that file traverse the access network. Notice, however, that the file contents traverse the access network even in the traditional case—they simply traverse it in path 1 rather than path 3. Hence for this operation the VPC does not add (beyond the conventional PC case) to the access-network bottleneck, although it should be noted that a small amount of overhead is necessary to carry the USB protocol over the access network.

The VPC does add to the access-network bottleneck for certain kinds of operations. For example, if the user installs a new program from a local DVD onto his or her disk drive, then the program and associated data will traverse the access network in the VPC case but not in the conventional PC case. Fortunately, such operations tend to be rarer than web-page downloads. They do, however, require a sufficient amount of bandwidth in the access network. In particular, they require upstream bandwidth that is generally not required in the conventional PC case, as will be described elsewhere herein.

Path 2 in the VPC case is similar to the corresponding path in the conventional PC case, except that in the VPC case the bandwidth of this path depends on SP equipment rather than user equipment. The SP can make this bandwidth as high as desired by deploying sufficiently fast storage servers and configuring the intra-CO network appropriately, as will be described below.

Bi-Level Scheduling

As indicated previously, a single CO 102 can serve thousands of subscribers, each of which can have multiple VPCs. For scalability, the compute servers 212 are preferably implemented using blade servers. A single blade on a high-end blade server can typically have up to eight CPU cores. In order to limit the number of blades required in the system 100, each of these CPU cores may be shared among multiple VPCs.

Figure 5:
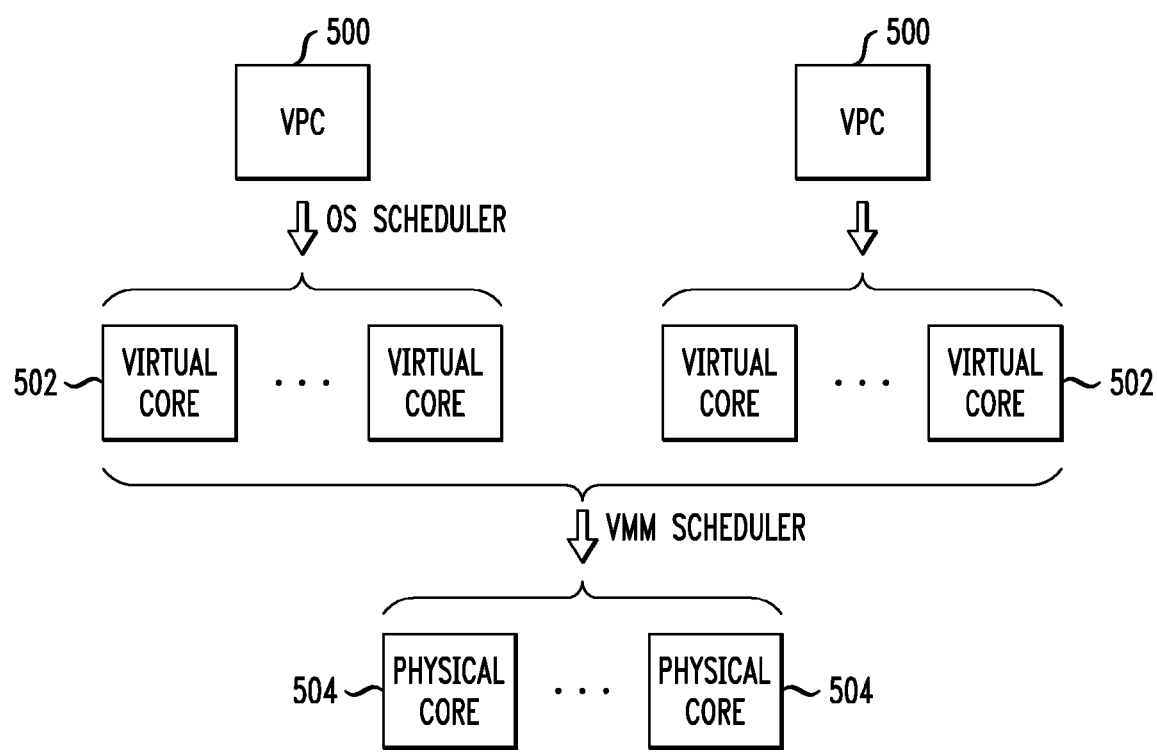
FIG. 5 illustrates bi-level scheduling of CPUs for VPCs.

FIG. 5 shows an example of bi-level scheduling that may be implemented in the system 100 to achieve a high level of sharing of CPU cores among VPCs. At the top of the figure are multiple VPCs 500. Each VPC is running an OS, which dynamically schedules threads of its virtual machine (VM) onto one or more virtual processor cores 502. A virtual machine monitor (VMM) running on the physical host dynamically schedules those virtual cores onto physical cores 504 of the compute servers 212.

For certain OSes, the number of processor cores specified when the OS is installed cannot be changed without re-installing the OS. For other OSes, the number of cores can be changed after the initial install, but only when the OS is powered down. For the remaining small number of OSes, the number of cores can be changed at any time, even when the OS is running. We will refer to these three OS types as reinstall, reboot, and dynamic.

TABLE I

SUPPORT FOR CPU RECONFIGURATION MODE VERSUS OS TYPE

|  | Reinstall | reboot | dynamic |
| --- | --- | --- | --- |
| GUI-driven | No support | partial support | full support |
| automatic | No support | partial support | full support |

Regardless of OS type, all existing OSes determine the number of available cores by probing the underlying system. When an OS is run on top of a VMM, these probes go into the VMM. The VMM is responsible for presenting the right number of cores to the OS.

As indicated previously, the system 100 may be configured to support different modes of hardware reconfiguration, for example, an automatic mode for normal users and a GUI-driven mode for power users. The different OS types provide different levels of support for these two reconfiguration modes. As shown in Table I, if the OS type is reinstall, then reconfiguration is effectively impossible because users will not want to reinstall their OS. If the OS type is reboot, then both reconfiguration modes are possible, but restricted to taking effect only after a reboot. This restriction is highly undesirable, given that the need to change the number of cores is typically discovered only when the user is in the middle of running an application. If the OS type is dynamic, then both forms of reconfiguration are fully supported. Hence, for the user to achieve all the benefits of the VPC, the OS should be dynamic. Unfortunately, the Windows OS is generally not dynamic. Under certain installation conditions the Windows type is reboot, and under other installation conditions it is reinstall. Therefore, implementing a VPC using the Windows OS may require enhancement of that OS.

A given compute server 212 of system 100 will, at any given time, be running a collection of VPCs 500. For each VPC in automatic mode, the system dynamically determines the "best" number of virtual cores 502 to assign to that VPC. That determination is made using a combination of dynamic observation of the applications running on the VPC, together with a priori knowledge of the needs of particular applications. To acquire the necessary information, the system may (with the user's permission) install and run observational software on the VPC. After the system determines the number of virtual cores to assign, it informs the VMM to present that number of cores to the VPC. Implementing this functionality will likely require modification to existing VMMs, because in most current VMMs the number of cores that are presented to a given VM is manually specified by a human administrator.

The set of VPCs 500 running on a given compute server 212 can change over time, as the result of load balancing across servers, and as a result of migration of VPCs across COs 102. Within a given CO, the system will attempt to perform load balancing across the compute servers and bi-level scheduling within each individual compute server. The goal is to maximize all users' perceived performance and the overall hardware utilization. Analogous scheduling is performed for all other virtual-to-physical resources, including memory and disks.

Pricing Models

A VPC running in automatic reconfiguration mode draws whatever "power" from the system 100 that the VPC requires. When you turn on such a VPC, the system allocates it enough CPU and system memory for good performance. If you then start, for example, a CPU-intensive application, the system detects that event and reconfigures the VPC to give it more CPUs. A good analogy is that of an electric lamp: When you turn on the lamp, it automatically draws the required amount of power. You do not, before turning it on, first have to phone the utility company and ask them to reconfigure its turbines to spin faster. If the bulb is 3-way and you turn up the wattage, you do not have to reboot or reinstall the lamp.

By enabling utility-style computing, the system 100 enables a variety of pricing models. In particular, the system supports demand pricing, a model in which users are charged for what they actually consume. The SP can, of course, provide flat-rate plans for users who prefer them. An expensive "gold" plan could provide whatever power your applications need, with no restrictions; a "silver" plan could get you whatever you need, up to a certain specified amount of CPUs and memory; a "bronze" plan could get you best-effort service. And just like the utility companies, the SP could offer a deal whereby you get a discount if you let the provider reduce your power during periods of heavy usage.

The important point is that the system 100 enables a variety of pricing plans without requiring any particular plan. The question of which plans to offer becomes a purely business decision.

Client-Server Cut Point

The system 100 implements a form of client-server computing: The user's applications run on a server (more particularly, in a VM running on compute server 212), and the output of those applications is displayed on a client (more particularly, a TC 220). A fundamental issue in the design of any client-server system is the design of the network protocol between the client and the server. For example, each application could be split into two pieces, which communicate via an application-specific protocol. Or the entire application could run on the server, with the server repeatedly sending the contents of its frame buffer to the client. The network protocol could alternatively be something between those two extremes. We refer to the point of separation between client and server as the "cut point."

A. Display Subsystem

To determine an appropriate protocol it is necessary to understand in detail the logical path that ultimately connects the application logic to the display device. Note that the details of that path vary significantly among OSes, and even from one version of a given OS system to the next. Because the majority of system users will want to run some flavor of Windows in their VM, we will analyze the path for that OS. We specifically analyze Windows Vista, because the Vista display subsystem is different from, and intended to obsolete, all other Windows display subsystems.

Figure 6:
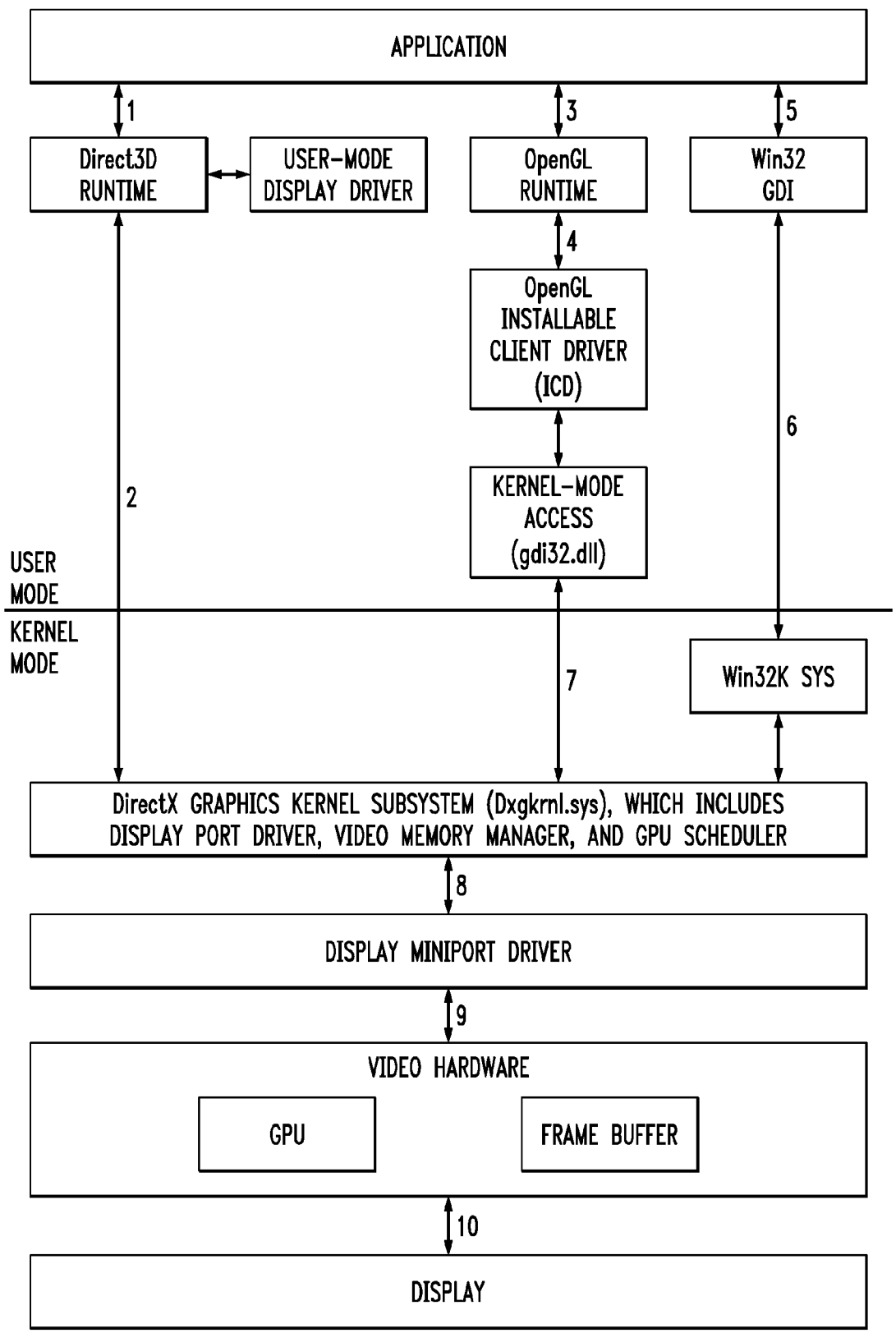
FIG. 6 is a block diagram of a display subsystem for VPCs.

FIG. 6 shows the Vista display subsystem, which we briefly explain. An application can produce output by ultimately talking to one of three Windows-provided subsystems: Direct3D, OpenGL, or GDI. On Windows, Direct3D is the preferred graphics subsystem. OpenGL, although almost universally used for 3D graphics in the Unix world, is used by a small minority of Windows programs. GDI is Windows' legacy graphics runtime.

In the non-client-server case, somewhere on the machine that is running the application there is some graphics hardware, located either in a chipset integrated on the motherboard or on a plug-in graphics card. In the simplest case the graphics chipset comprises primarily a frame buffer and some logic. The frame buffer actually comprises of a collection of several different kinds of buffers, one of which is the color buffer, which contains the pixels comprising the image to be displayed. The hardware logic reads the color buffer and sends it out onto the external video connection, typically either VGA or DVI, although other standards may be used. Higher-end hardware also contains a graphics processing unit (GPU), which is a complex piece of hardware that can take a sequence of drawing commands and image data and "compile" it down to pixels, which the GPU inserts into the color buffer. The user, when he or she buys a conventional PC or graphics card, chooses application-enabling graphics hardware—that is, graphics hardware that supports the particular set of applications that he or she wants to run. Successive generations of GPUs are successively more powerful, and are able to run increasingly more graphics-intensive applications. The manufacturer of the graphics hardware also supplies a driver for that hardware. Under Vista the driver is divided into three pieces, two of which run in user mode and the other in kernel mode. The user-mode pieces are used by the Direct3D and OpenGL runtimes. The kernel-mode piece (also called the "miniport" driver) talks to the graphics hardware, which in turn talks to the display device, the latter of which can be either built-in or external.

B. Cut Operations

Figure 7:
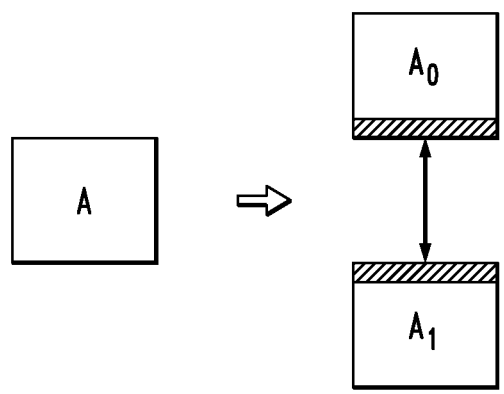
FIGS. 7 and 8 illustrate exemplary cut operations for VPCs.

In the client-server case, the network protocol may be internal to one of the boxes shown in FIG. 6, or may correspond to one or more of the numbered arrows shown in that figure. FIG. 7 shows a cut internal to a box. For this operation we take a box A, cut it into two pieces $A_0$ and $A_1$, and provide a network protocol to connect the two pieces. We then modify some subset of A's original implementation to enable the now-divided box to speak the network protocol; these changes are drawn as hashed in FIG. 7.

Figure 8:
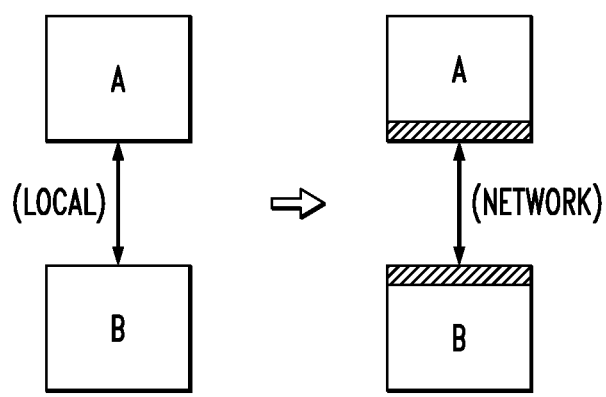

FIG. 8 shows a cut corresponding to an arrow. For this operation we take two boxes A and B that are connected by a local protocol, and we replace that protocol with a network one. We then modify some subset of A and B's implementation to enable them to speak the new protocol.

There can be many ways to map a given local protocol to a network one. In the most direct mapping the network protocol simply encapsulates the unadulterated local protocol. Such direct encapsulation often does not result in a good network protocol, because of the differences between local and network communication paths. Local paths (implemented using hardware busses, direct API calls, and so on) typically have higher bandwidth, have lower latency, and are more secure than network paths. To create a good network protocol we might have to modify the local protocol in some way, such as compress it (to reduce bandwidth), cache it on one side or the other (to reduce latency), or encrypt it (to improve security). In the extreme case we might replace the local protocol with a completely different protocol. Note that the more changes we make to the protocol, the larger will be the changes necessary to A and B.

Making the necessary changes to a box can raise certain issues. For example, if the box is implemented using proprietary (i.e., closed) source code, then it may be impractical to modify any of the code inside it. For such a box, one could make changes by adding layers of code to the upper and lower interfaces of the box.

Cut-Point Analysis

We now analyze each cut-point possibility in turn. Boxes and arrows refer to those in FIG. 6. As will become apparent, the cut points have different advantages and disadvantages. In a given embodiment of the invention, one can trade off these various advantages and disadvantages in determining an appropriate cut point based on the particular needs of that embodiment. Thus, different ones of the cut points described may be selected for use in different embodiments of the invention.

A. Internal to Application

This approach would require that every application be rewritten for the system 100. Such an approach is generally not preferred for use in system 100, because as indicated above one of the desired properties of that system is that it provides support for unmodified applications.

B. Internal to Some Other Box

Because of the proprietary nature of Windows and commercial graphics hardware, making the cut internal to any of the nonapplication boxes shown in FIG. 6 will generally be difficult and impractical. Therefore, this approach is also not preferred for use in system 100.

C. Arrows 1, 3, and 5

In this approach all communication (that is, API calls) between applications and the various Windows graphics subsystems is carried over the network. There already does exist a system for carrying OpenGL calls across a network; similar work has also been done for Direct3D. This approach has several major disadvantages, however. First, the network protocol would have to track both the Direct3D and OpenGL APIs, the former of which is controlled by Microsoft, and both of which change periodically. Having the network protocol of system 100 encapsulate a proprietary, changing protocol is undesirable.

Notice that in this approach the TC implements the Direct3D and OpenGL runtimes. A TC that supports only those two display subsystems is nonuniversal—not able to support a VPC running a current or future OS whose display subsystem uses some other protocol. We strongly prefer that the TC of system 100 be universal and independent of the user's display subsystem.

Finally, this approach requires the TC to contain the application-enabling graphics hardware for the TC user's specific application mix. If the user adds a new application or upgrades an application such that the new mix requires more powerful graphics hardware, then the user must replace the TC's graphics card. That's not as bad as having to replace an entire PC, but it would be preferable (everything else being equal) that the user never have to replace any hardware.

D. Arrows 2, 6, and 7

In this approach all graphics-related communication between user space and kernel space is carried over the network. Similar comments apply here as for the previous approach.

E. Arrow 8

In this approach the cut is between the kernel portion of the driver and the rest of the OS. This approach does not require any portion of Windows to be implemented in the TC, but it does require that the network protocol understand and track the DirectX driver protocol, which is both Windows-specific and proprietary. It is relevant to note that DirectX forwarding is actually implemented in Windows Vista, but the Vista implementation imposes several additional requirements: First, the server must contain a GPU and associated driver; second, the client must contain a GPU of the same or later generation; and third, the client and server must be running Vista, and the same version of Vista at that. These requirements would likely be difficult to meet in a given implementation of system 100.

Finally, this approach, like the previous ones, requires the user potentially to have to upgrade the TC's graphics hardware.

F. Arrow 9

In this approach the cut is between the driver and the hardware. There are several issues that arise in utilizing this approach. First note that implementing this approach requires understanding the low-level hardware interface. Most commercial graphics cards have proprietary interfaces and closed-source drivers; hence, this approach introduces significant nontechnical issues.

Second, because of the differences between local and network data paths, as described previously, this approach can significantly increase the delay between the driver's issuing a request and receiving a reply. It is likely that the closed-source drivers would have to be modified to deal with this delay.

Third, a direct encapsulation implementation of this approach can unduly increase the traffic on the access network 106. Most modern high-end graphics cards connect to the motherboard via a PCI Express ×16 bus. The data rate on this bus is 32 Gb/s. Although there will not always be that much actual traffic over the bus, there may be periods of time in which the traffic approaches the maximum rate, particularly during operations such as image and texture download. The access network must be able to carry this traffic without undue delay. This issue can be addressed by compressing the traffic to the TC.

Finally, this approach still requires the user potentially to have to upgrade the TC's graphics hardware.

In a Unix equivalent of FIG. 6, the DirectX box would be replaced by the kernel portion of the X window system, and the display miniport driver would be replaced by the X display driver. There does exist at least one TC protocol, called THINC, that cuts the arrow connecting those two boxes. See R. A. Baratto et al., "THINC: A virtual display architecture for thin-client computing," in Proceedings of SOSP 2005, IEEE, 2005. THINC does not do direct encapsulation; instead, THINC makes numerous static and dynamic run-time optimizations to the display protocol.

Although THINC achieves some impressive results (including high quality video playback over wireless), there are a number of issues associated with adaptation of THINC for use in system 100. First, THINC does not yet run on Windows. More important, THINC relies on a display driver interface that does not apply to Windows and does not support 3D graphics. However, THINC could be extended to support them.

G. Arrow 10

In this approach the cut is between the graphics hardware and the display device. Unlike all preceding cuts, the local protocols that operate over this arrow (VGA, DVI, HDMI, DisplayPort, and others) are published (except for the HDCP portion of HDMI) and relatively unchanging. Although new display protocols are occasionally introduced, a given protocol rarely changes.

With this approach the application-enabling graphics hardware is located in the server. The TC must have some graphics hardware, but it need not be application-enabling.

Hence, this approach, unlike all the previous ones, does not require the user to upgrade the TC's graphics card.

A direct implementation of this approach puts a lot of traffic on the access network. If the TC's display is, say, 1680×1050 pixels with 32-bit color at 60 frames per second, then, without compression, that is over 3.3 gigabits per second for that one TC. Clearly compression is preferred.

Probably the most well known display compression algorithm is Remote Frame Buffer (RFB), the protocol used in Virtual Network Computing (VNC) and its derivatives. RFB does not, however, work well on motion video. There exists at least one commercial chip that uses hardware for display compression. Other display compression work targeting TCs has been done. See, for example, B. O. Christiansen et al., "Fast motion detection for thin client compression," in Proceedings of the Data Compression Conference, IEEE Computer Society, 2002, and B. O. Christiansen et al., "Streaming thin client compression," in Proceedings of the Data Compression Conference, IEEE Computer Society, 2001. However, these compression algorithms may not provide a suitable level of performance.

Figure 9:
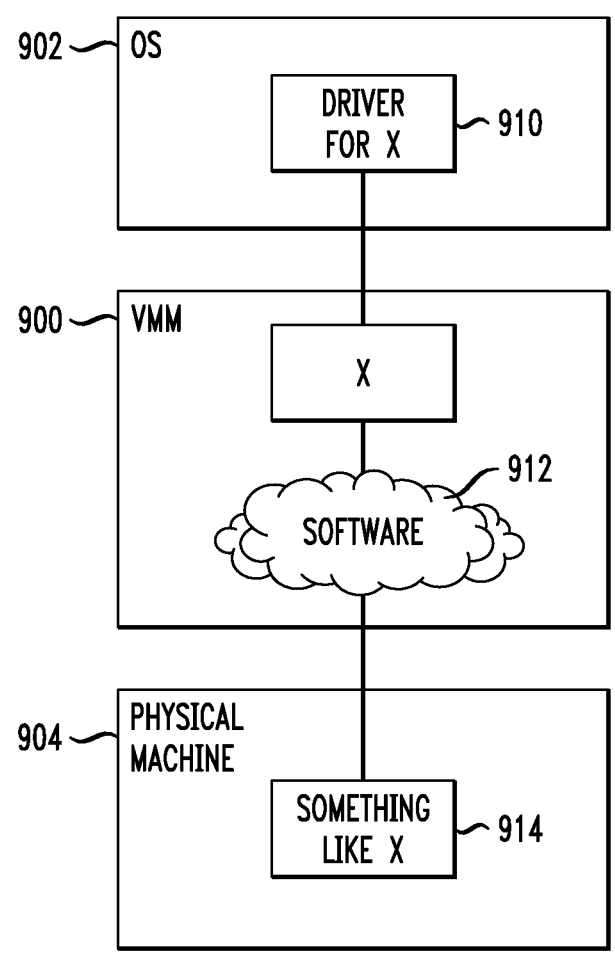
FIG. 9 is a block diagram illustrating device virtualization for VPCs.

To understand the further issues associated with this approach, it is necessary first to understand more about how VMMs virtualize hardware. FIG. 9 shows a VMM 900 presenting a virtual device X to an OS 902 running on top of the VMM. The VMM is coupled to a physical machine 904. When the OS boots, it typically probes for the presence of device X. The VMM intercepts the probes and sends replies that are identical to the replies sent by a real device. When the OS's device driver 910 attempts to talk to the device, the VMM sends replies that are identical to those sent by a real device. The functionality of the VMM is implemented in part utilizing software 912.

For many types of devices, the VMM will implement a virtual device using a physical device 914 of the same or similar type. For example, all VMMs implement virtual Ethernet adapters using physical adapters. That's because Ethernet adapters are virtualizable—that is, they have the properties that enable a VMM to implement multiple instances of a virtual device via a single instance of the physical device.

Now consider the case of a graphics adapter that does not have a GPU. The usual implementation of such a device is not virtualizable, for the simple reason that it has a single color buffer, which cannot be shared by multiple VMs. Hence, VMMs do not implement virtual graphics adapters using physical adapters. Instead, VMMs implement virtual graphics adapters entirely in software. In particular, the color buffer is stored entirely in system memory—no local graphics memory is involved. The VMM does not generate any actual display output signal (such as DVI) from that color buffer. The color buffer is instead used to store the image for remote viewing via a tool such as VNC, as will be described in greater detail below.

Now let us add a GPU back into the picture. Although it is possible to emulate a GPU (or any hardware device) in software, general-purpose processors typically cannot achieve the desired performance (which is why GPUs are used in the first place). Hence, the GPU is implemented at least partially in hardware and virtualized by the VMM.

One possible approach is simply to virtualize a complete commercial GPU chip. No VMM, however, has done that, for a number of reasons. First, there may be something about the way current GPUs are designed that renders them nonvirtualizable. Although current GPUs are highly interruptible and can be context-switched among multiple processes running in a single OS, there might be a technical reason why GPUs cannot be context switched among multiple OSes. Second, even if the GPU itself were virtualizable, we would still have the shared color buffer issue. It may be difficult to connect a virtualizable GPU to either a shareable color buffer or multiple independent color buffers. Third, the hardware interfaces for commercial GPUs are usually highly proprietary and closed; virtualizing them would involve addressing the necessary business-related issues. Fourth, these hardware interfaces frequently change, which renders it difficult for the VMM implementor to keep up with them. Fifth, most current server-class blades do not even have GPUs.

Another issue with this approach is that GPUs consume a lot of power: up to 400 watts for the current highest-end models. To lower power consumption, the server could be populated with a range of GPU models. But then each VPC would have to be dynamically assigned the right GPU—specifically, the minimal power GPU that is application-enabling for that VPC's current application mix. For example, when the user starts up a video game that requires a high-end GPU, his VPC should be dynamically reassigned to such a GPU. Dynamically reassigning a running machine (real or virtual) from one GPU to another can be difficult. And finally, note that each time a new GPU generation is released, system users would not be able to use the new generation of GPU (and hence play the new generation of games that require that GPU) until the SP built a blade containing those GPUs and populated the system with those blades. This process might take much longer than the time it takes users of conventional PCs to run to the local consumer electronics store and buy a new graphics card. Such users would not like the additional delay imposed by the system.

Graphics Processing

Most of the GPU-related issues just described could be addressed by dispensing with a commercial GPU chip and instead implementing, on the server, a large pool of GPU hardware subcomponents. Each individual subcomponent implements a small piece of functionality that is used to implement GPU pipelines. For example, one subcomponent might implement a discrete cosine transform, another might implement a certain set of floating point operations, and a third might implement some specific rendering subfunction. Each VM running in the server then dynamically builds the precise GPU that it needs, by allocating subcomponents from the pool and connecting them into a pipeline, thereby creating any desired GPU on the fly.

To emphasize: The GPU resource pool (GPUL, for short) does not contain GPUs; it contains GPU building blocks. The physical interconnection of the subcomponents may be implemented, for example, using a fast crossbar switch or other similar switching element.

GPUL will also preferably include a programming language that is used to assemble subcomponents. The GPUL would be shipped with a number of pre-written programs that can be used to assemble, say, DirectX 10 or OpenGL 4.2, GPUs. Scientific and games programmers could write whatever programs they like.

A given implementation of GPUL will generally specify the subcomponent decomposition, the number and type of each subcomponent, and the subcomponent-assembly programming language. It will also preferably be configured with appropriate Windows drivers, so as to avoid kernel changes.

It should be noted that when a VM builds a given virtual GPU utilizing the GPUL, it is preferable that the frame buffer be allocated such that it is in the address space of the processor that runs the VM, but physically located inside the chip that implements the GPUL.

The benefits of GPUL are significant. First, GPUL uses GPU resources more efficiently than traditional GPUs. Existing (NVIDIA and ATI) GPUs provide a lot of functionality, much of which is unused at any given time. For example, modern GPUs typically contain an MPEG decoder, which is unused unless a current application is processing an MPEG stream. With GPUL, on the other hand, the VM can build a GPU contain exactly the functionality that it needs, no more, no less. Further, the VM can dynamically rebuild the GPU (when, for example, the user starts an application that requires MPEG processing).

Second, gamers would benefit greatly from GPUL. With current GPU technology, game developers face the following design loop:

Step 1: Game developer wants to implement better graphics feature in game, but determines that even the highest end existing video card cannot sufficiently accelerate the feature.

Step 2: Game developer feeds this info back to NVIDIA, ATI, and Microsoft.

Step 3: Game developer waits for NVIDIA and ATI to build a new, more expensive video card with the required functionality. Game developer also waits for Microsoft to come out with a new version of DirectX that provides access to this functionality.

Step 4: Game developer waits for end user to replace his video card and also upgrade Windows.

With GPUL this entire, unduly slow loop is eliminated. Instead, the game developer who needs a new GPU feature makes a single software change to the program that dynamically configures the end user's GPU. NVIDIA, ATI, and Microsoft are out of the picture, although this capability might require that the appropriate drivers support dynamic reconfiguration.

Third, scientific programmers would greatly benefit from GPUL. There are a number of systems that give scientific programmers access to the massive floating point functionality contained in modern GPUs. The programmer, however, is still restricted to the hardwired pipeline found in the GPU, a pipeline that was designed for graphics acceleration, not for general scientific computing. GPUL, on the other hand, would let scientific programmers assemble the subcomponents any way they like.

Color-Buffer Transfer

As indicated previously, an illustrative embodiment of system 100 may be configured to transfer contents of a color buffer in a compute server 212 to the TC 220. Two examples of color-buffer transfer algorithms will now be described.

Figure 10:
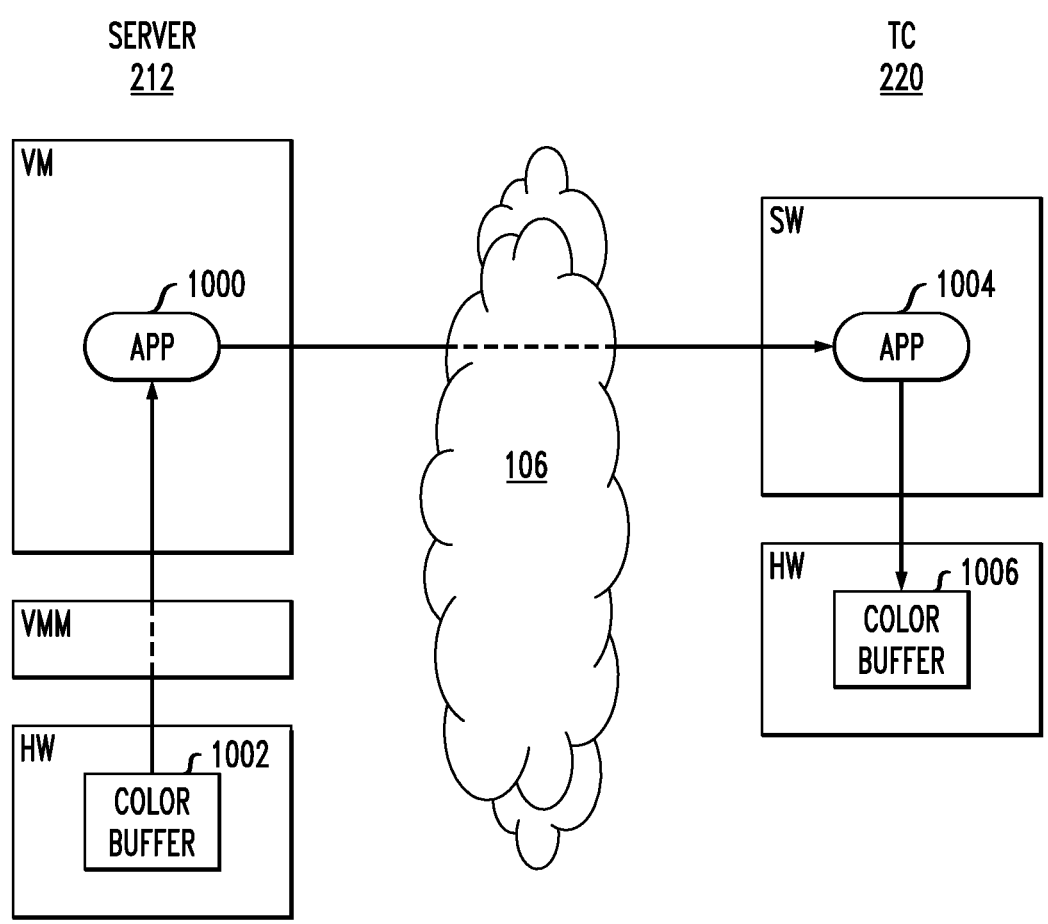
FIGS. 10 and 11 show respective application-mediated color-buffer transfer and hardware-mediated color-buffer transfer in an embodiment of the invention.

FIG. 10 illustrates a software-mediated transfer approach. In this example, a client-server application, implemented in software, performs the transfer. A server side portion 1000 of the client-server application repeatedly reads the contents of a color buffer 1002 and sends it to a client side portion 1004 of the client-server application, which delivers it to the client's color buffer 1006. The application can be "push" (server decides when to send) or "pull" (client decides when to receive). Well-known examples of such applications are VNC and Remote Desktop Protocol (RDP).

Application-mediated transfer would likely raise performance issues. Several or many times a second the server side must reach through all the middleware to ask the driver for the contents of the current color buffer, optionally compress those buffer contents, and then push the compressed buffer contents back down into the kernel for transmission to the client. All this work requires significant CPU cycles that could otherwise be spent executing other programs or other VMs. Further, when the color buffer is read the GPU hardware pipeline stalls and, under Vista, the desktop pipeline stalls as well. The result may be a noticeable reduction in graphics performance.

If the application mix generates output that is mostly static (which is the case for the typical office applications), then software-mediated transfer works tolerably well. As soon as any dynamic, graphics-intensive applications are added to the mix (for example, watching a YouTube video), visual quality becomes unacceptable. And even under mostly static conditions, software-mediated transfer may not provide the feels-like-a-PC responsiveness desired by the system.

Figure 11:
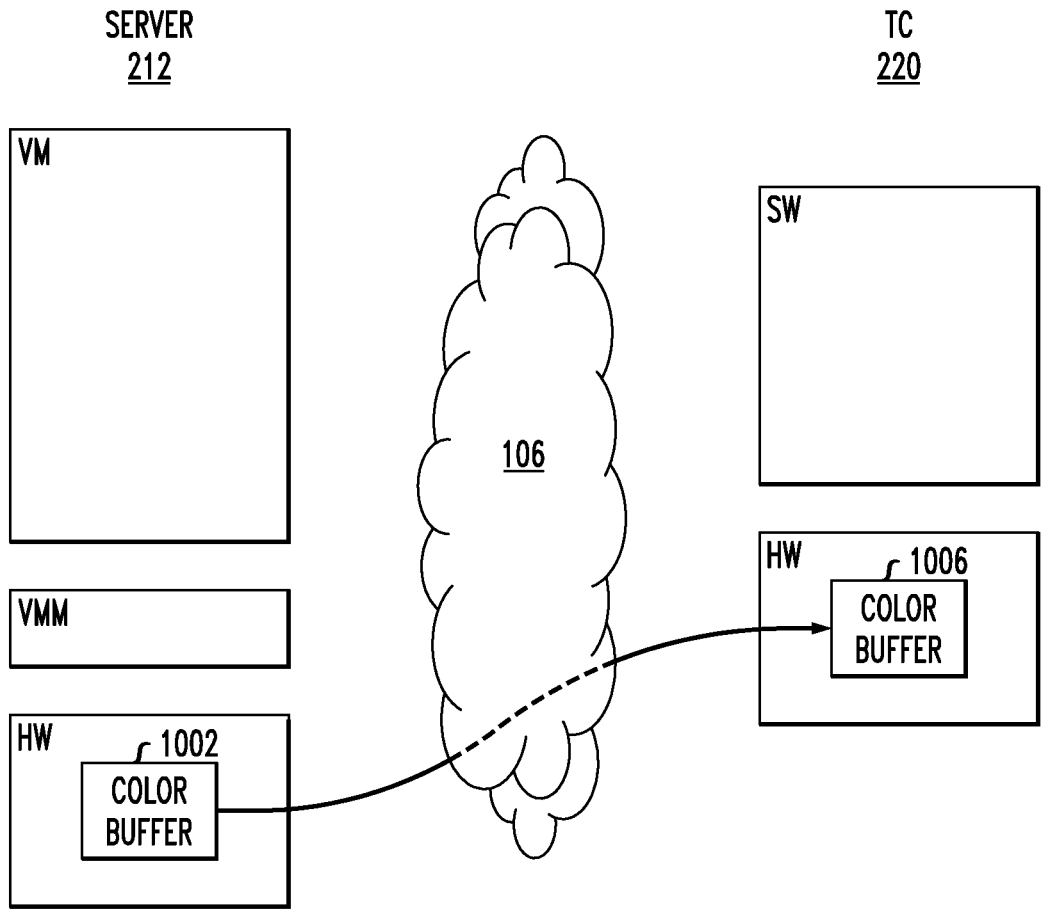

FIG. 11 illustrates a hardware-mediated transfer approach that offloads all the transfer work to hardware. This hardware, which may be implemented using an FPGA, ASIC or other processing device, repeatedly reads out the color buffer, optionally compresses the buffer contents, then performs packetization and delivers the resulting packets into the network for transmission to the client.

One example of a known commercial chip that implements hardware-mediated transfer for TCs is known as the Teradici. Teradici takes as input two DVI signals and transmits compressed packets onto its Ethernet interface. Teradici also has other non-graphics-related functionality. The input DVI signals are signals generated from a color buffer. However, a typical VMM-based server will usually not generate any DVI signal from the VM color buffers. Hence, the Teradici, as designed, would likely require some modification in order to be used to implement system 100. One could attempt to modify the Teradici by having it directly read the contents of the color buffer. However, that may still not be sufficient in a given embodiment, because a given compute server of system 100 may be executing many VMs at a given time, each with its own color buffer.

Figure 12:
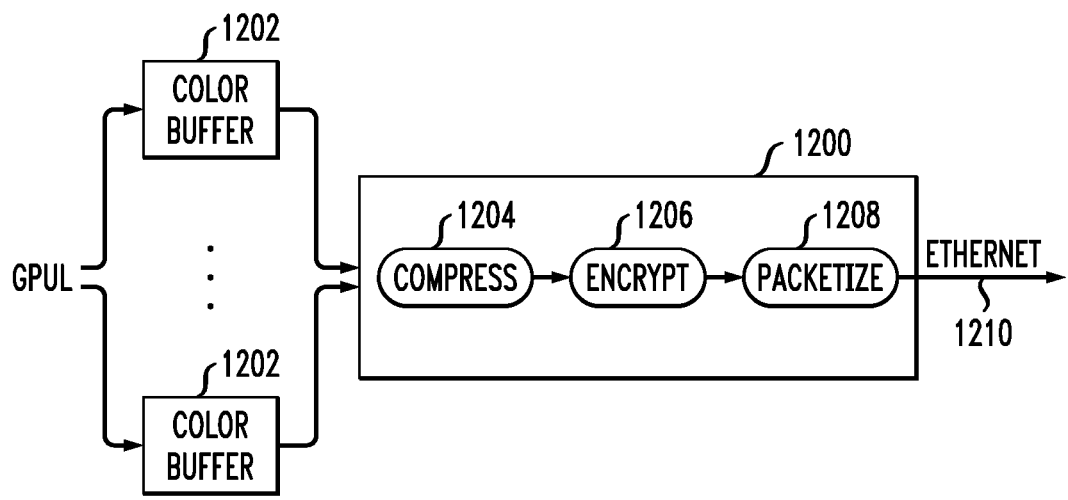
FIG. 12 is a block diagram of a hardware-mediated transfer element in a compute server.

FIG. 12 shows an example of a chip 1200 that can be used to implement the above-described hardware-mediated transfer functionality. This chip can simultaneously read a large number of color buffers 1202, where each color buffer is fed by the previously-described GPUL. The chip compresses, encrypts, and packetizes the contents of the color buffers, using respective hardware processing elements 1204, 1206 and 1208, and transmits the resulting packets onto a network interface 1210, which in this embodiment is an Ethernet interface. A corresponding but simpler chip would be implemented in each TC of the system 100, to perform complementary depacketization, decryption and decompression operations to supply a single color buffer in that TC.

In an illustrative embodiment described above, system 100 transports display output of a given VM through the access network 106 and, potentially, through a residence or enterprise network to the TC. Putting display output onto two networks, one of which is not even controlled by the SP, may introduce digital rights management issues. Such issues can be resolved using known digital rights management techniques.

To work correctly with VMs that are running Windows, the hardware-mediated transfer chip 1200 would typically have to masquerade as a display device. For example, it would generally have to implement the Display Data Channel. This design would work well in all versions of Windows prior to Vista. For Vista to work, however, any connected display device must support HDCP. If the display device does not support HDCP, then Vista will not send it any pixels. However, there are a number of drawbacks to implementing HDCP. For example, one must add a significant amount of logic to the chip, and pay the necessary fees to the HDCP license holders. Further, for the hardware-mediated transfer chip to be granted an HDCP license, the devices that it talks to—namely, the TCs—must also implement HDCP. Therefore, implementing HDCP in both the hardware-mediated transfer chip and TC introduces additional cost and complexity.

The chip 1200 is one example of what is more generally referred to herein as an "integrated circuit." The latter term is intended to encompass, by way of example, an FPGA, an ASIC or other circuit in the form of one or more semiconductor die.

The TC Protocol

As mentioned previously, the job of the TC protocol (which we abbreviate TP) is to connect the user's local input and output devices to the compute server. We divide these devices into three categories: audio, video, and data.

A. Audio

By "audio" we mean speakers and microphones. Although most audio devices have TRS connectors (also called jack plugs), there do also exist USB audio devices. USB devices are covered below in part C of this section. Here we discuss the TRS-based versions.

The TRS-based devices are implemented in TP as follows. In the downstream direction, TP conveys audio packets from the VPC to the user's speakers. To do that, the system 100 installs its own audio-output driver into the VPC. This driver intercepts all generated audio packets and redirects them into the network. In the upstream direction, TP conveys audio packets from the user's microphone to the VPC.

B. Video

In the upstream direction, TP conveys video packets from the user's video-capture devices (if any are present) to the VPC. Because such devices are typically USB, we treat them in part C of this section.

In the downstream direction, TP conveys video packets from the VPC and the optional VOD server to the user's display. We will first consider the case without VOD.

At any given time, a VPC can be displaying one or more different types of images: the relatively static images of the typical office applications, two- or three-dimensional game images, low-definition video from YouTube, and real-time video of a live sports event, to name a few. These and all other images fall into two categories: interactive—those images with which the user interacts and for which he expects fast responsiveness to his inputs; and noninteractive—those images for which the user is a passive recipient.

The encoding used for interactive images must have low latency; the encoding for noninteractive images need not. Both encodings should achieve maximal compression. For noninteractive images the current encoding of choice is H.264 (also known as MPEG-4 AVC).

H.264 has a number of parameters that can be tweaked to trade off compression for latency. When those parameters are set to maximize compression, the resulting latency is too high for interactive images. When those parameters are set to minimize latency, the resulting latency is still too high for interactive images. See, for example, D. De Winter et al., "A hybrid thin-client protocol for multimedia streaming and interactive gaming applications," in Proceedings of NOSSDAV 2006, 2006. Hence, a different encoding is preferably used for interactive images.

Numerous interactive image encodings are known and widely used, including VNC and RDP. Various other proprietary encodings might actually be more widely used, but they are not as familiar. Most of these encodings do not perform well when the image contains motion video. One encoding that does reasonably well on some types of motion video is the above-noted THINC. Not even THINC, however, can beat H.264 for all types of noninteractive video.

Because no encoding works well for all image types, system 100 should be configured to encode interactive regions with an interactive encoding and the remaining regions with a noninteractive encoding. To do that, the encoder subsystem on the compute server may perform the following actions:

1) identify, at any given moment, the region boundaries;
2) determine the best encoder for each region;
3) route the pixels for each region to the chosen encoder; and
4) send the encoded streams to the TC, along with information specifying the stream's encoder and region.

The TC parses all this information and displays the final image. It should be noted that steps 1 and 2 may be difficult to perform in a closed OS such as Windows.

Figure 13:
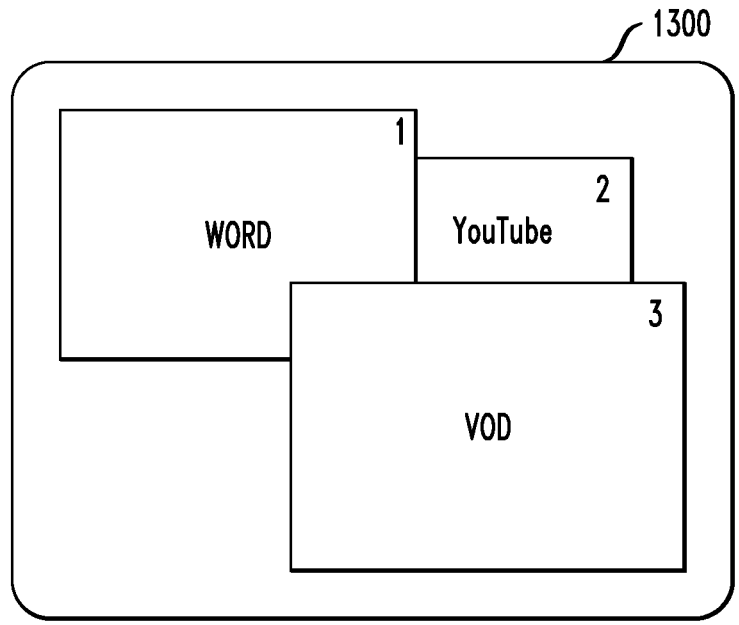
FIG. 13 shows an example of a thin client display.

Now consider VOD. FIG. 13 shows an example TC display 1300 of a user who is running an office application (such as Microsoft Word) in window 1, playing a YouTube video in window 2, and watching a VOD in window 3.

One way to create the VOD window would be for the user to start up a Windows application that asks for the name of a VOD, sends a command to the VOD server 216 telling it to stream the stated VOD to the VPC, and then textures the received VOD into a native window. That implementation, however, puts the CPU of the compute server 212 in the VOD media path.

The system 100 may alternatively be configured to offload the compute server CPUs from the VOD streams. To do that, the Windows application will instead send a command to the VOD server 216 telling it to stream the VOD directly into the access network 106. The VPC also sends information to the TC indicating the appropriate size and location of the VOD window. The TC then overlays the VOD onto the VPC's native display.

C. Data

Other than TRS-based speakers and microphones, and all displays, the vast majority of modern peripherals are USB. To handle such devices, TP conveys all USB packets between the VPC and the user's USB ports.

Inside the Thin Client

The TC 220 may contain a GPU, as will be described below with reference to FIG. 14. Alternatively, it may contain just a simple graphics chip. If a GPU is present, an FPGA may offload to the GPU any video decoding that the GPU is capable of doing. If a GPU is not present, the FPGA may perform all video decoding, and dump the resulting pixels into the color buffer. Other types of integrated circuits or processing elements may be used in place of an FPGA in alternative embodiments.

Figure 14:
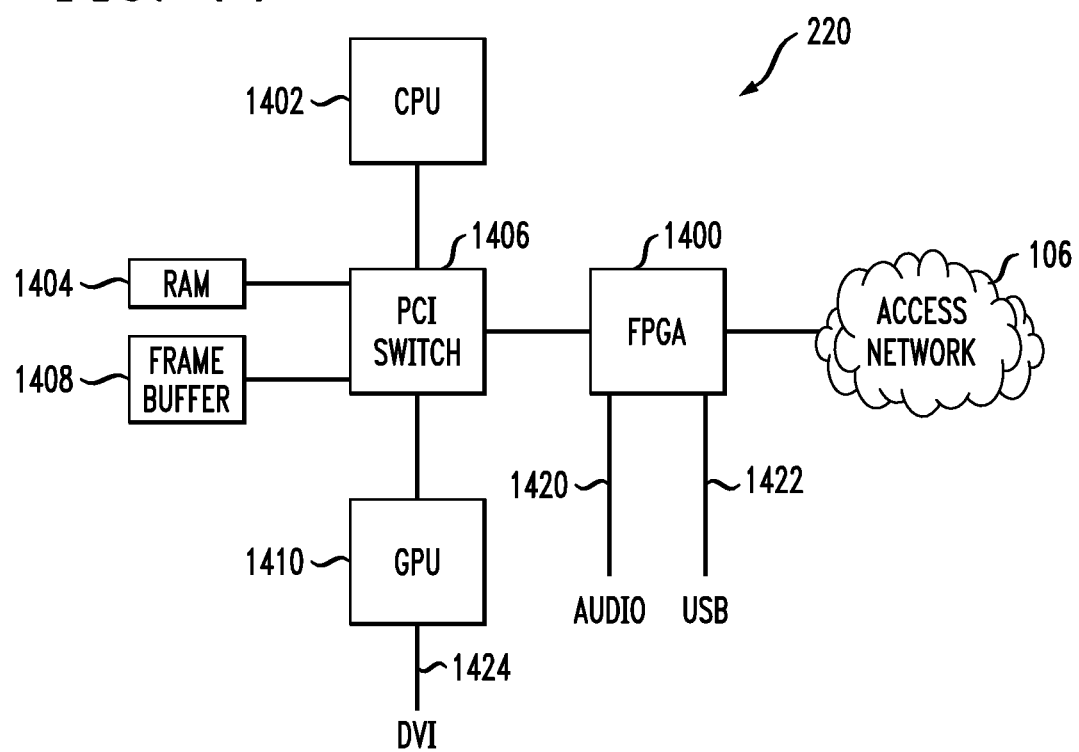
FIG. 14 is a block diagram showing one possible implementation of a thin client.

FIG. 14 shows one example of an internal implementation of a TC 220 of the system 100. The TC in this embodiment comprises an FPGA 1400 configured to enable the TC to be dynamically reconfigured by the compute server 212. For example, the server may decide to dynamically download a new video codec, or a completely new TC firmware image. This capability renders the TC very unlikely to ever require replacement. The TC further comprises a CPU 1402, RAM 1404, PCI switch 1406, frame buffer 1408 and GPU 1410. Conventional aspects of the operation of such TC elements are well-known to those skilled in the art and will therefore not be described herein.

Packets received from the access network 106 are categorized by the FPGA 1400 into a number of categories, such as, for example, control packets and media packets. If the packet is a control packet, the FPGA logic performs a DMA operation via PCI switch 1406 to store the packet into a control memory portion of RAM 1404, and notifies the CPU so that the CPU can then process the packet.

If the packet is not a control packet, then it is an audio, video, or data (e.g., USB) packet. If audio or data, the FPGA logic sends the packet to an appropriate output port 1420 or 1422. If video, the FPGA logic examines the encoder type that was used on the packet. If the corresponding decoder is not implemented in the GPU 1410, then the FPGA decodes the packet and performs a DMA operation to store the result into the frame buffer 1408. The GPU is responsible for delivering the contents of the frame buffer out onto an external DVI port 1424. If the GPU can decode the packet, the FPGA sends the encoded packet to the GPU, which will decode it and display it appropriately. Processing of packet types other than control or media packets may also be supported.

The TC may of course be configured with additional or alternative elements. For example, the TC may have an external PCI Express slot that is directly connected to the PCI switch 1406. This slot would allow the TC to support additional GPUs, using appropriate video cards that can be plugged into the slot. Note that the subset of this design comprising everything in FIG. 14 other than the FPGA may be configured in a manner similar to the design of a typical PC motherboard.

Migration Between Central Offices

It was mentioned above in the context of FIG. 2 that when a user moves from a TC 220 served by one CO 102 to a TC 220 served by a different CO, the system 100 migrates the VPC to the new CO via the back-end network 200. To implement that migration, both the user's VM and virtual disks are migrated.

A VM can be migrated either live—that is, while the VM is running, or nonlive—that is, while the VM is "powered down." A number of known VMMs do support live migration. However, there are significant restrictions on the conditions under which live migration can occur using known VMMs. First, the storage device on which the VM's virtual disks are stored must be accessible by both machines. Second, the network interfaces for both the source physical host and target physical host must be in the same subnet. Third, the source and target hosts must have the same model of processor (in some cases even the same model version).

Consider the first restriction. There are in practice at least three ways of making a storage device accessible to a given machine: Network File System (NFS), Internet Small Computer Systems Interface (iSCSI), or Fibre Channel. Because the NFS protocol can experience high and unpredictable latency, it is generally not suitable for use in system 100. Of the remaining two protocols, iSCSI is simpler and is Ethernet-based. Hence, the storage servers 214 are preferably iSCSI servers. To achieve sufficiently low latency, it is also preferable that the storage servers be colocated with the compute servers 212. It is possible that other types of known storage protocols may be utilized in a given embodiment of the invention, including, for example, Infiniband and Common Internet File System (CIFS).

For a compute server in a different CO to access a given iSCSI storage array, there must be an iSCSI network connecting the two COs. Although wide-area iSCSI is possible, it is doubtful whether an SP will want to build or overlay an iSCSI network connecting all the COs of system 100. Even if such a network were available, the latency incurred by the wide-area access would likely be unacceptable. Accordingly, one of the other storage protocols noted above may be preferable for a given embodiment.

Now consider the second restriction. Most pairs of COs will not be in the same subnet, and no amount of tinkering with the network will change that fact.

Finally, consider the third restriction. It is unreasonable to expect all compute servers in all COs to have the same processor models. Removing this restriction would generally involve adjustments in the design of both VMMs and processors.

Given that none of the current preconditions for live migration are met when moving VPCs from one CO to another, the system 100 may be configured to support only nonlive migration. When performing nonlive migration, a fundamental issue is how to represent and move virtual disks. Consider the following: One modern high-end gaming PC targeted to home users (the Dell XPS) can be configured with up to 2.75 terabytes of disk space. Transferring a virtualized version of this disk en masse to a different CO over a dedicated Gb/s network would require over 6 hours, which is unacceptably slow to the user who took only a 10-minute drive to get from the old location to the new location.

Some known systems address this issue by intelligently "trickling" the contents of disks from one location to another. See, for example, M. Satyanarayanan et al., "Pervasive personal computing in an internet suspend/resume system," IEEE Internet Computing, 2007. The trickling approach uses a combination of predictive pushes and demand pulls of disk chunks. Disk chunks are themselves stored in a distributed file system specially designed to support virtual-disk migration. A given implementation of system 100 may employ such a distributed file system, in combination with high bitrate (10 Gb/s or even 100 Gb/s) links in the back-end network.

It is also possible that a given embodiment may be configured to utilize VMMs that are modified so as to not be subject to one or more of the above-noted restrictions.

The Intra-Co Network

Figure 15:
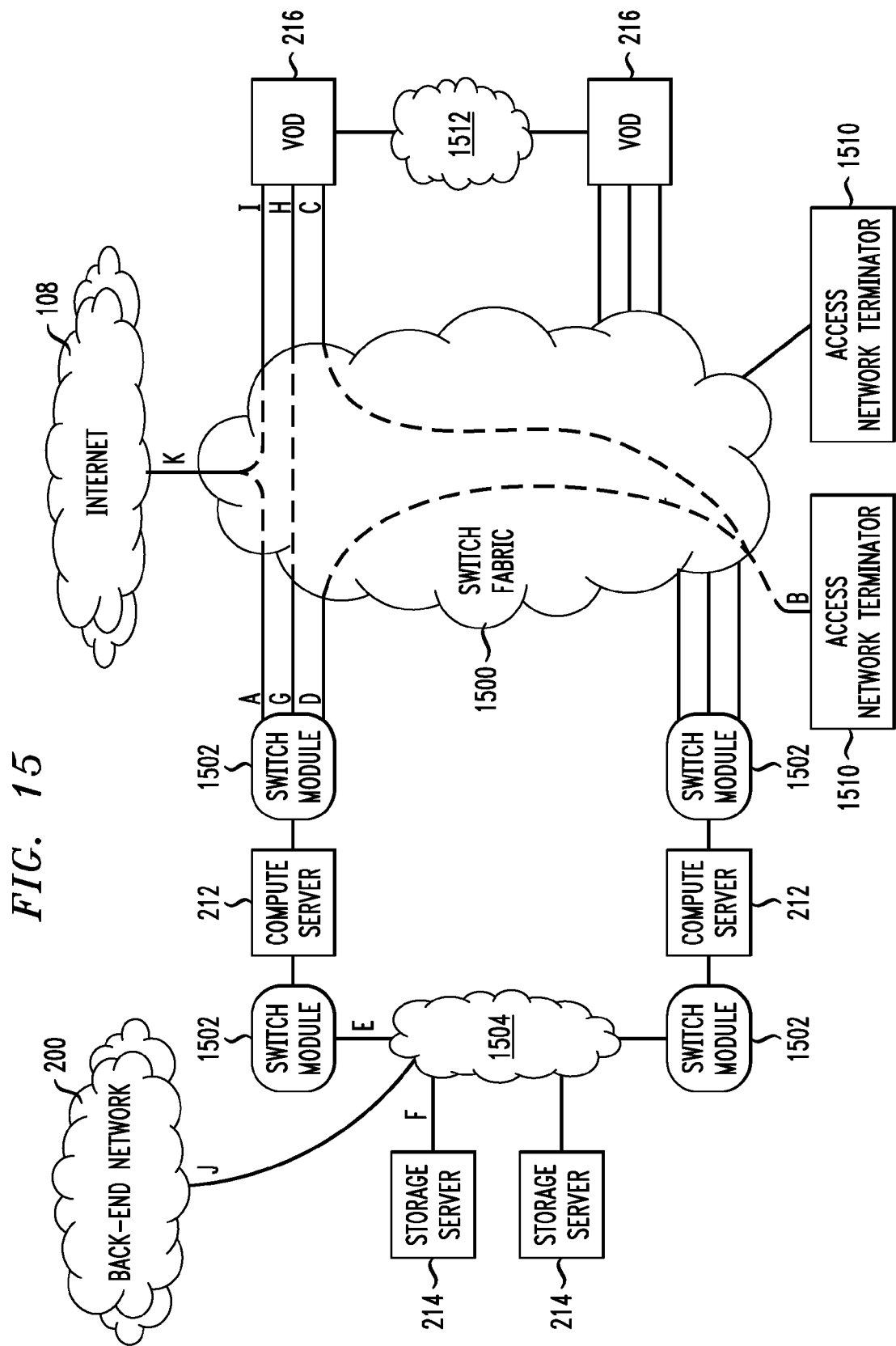
FIG. 15 shows a more detailed view of an intra-CO network in an illustrative embodiment of the invention.

FIG. 15 shows a more detailed view of the intra-CO network 210 of FIG. 2. The intra-CO network in this embodiment comprises a distributed switch fabric 1500. Each compute server 212 in this embodiment is assumed to comprise a blade chassis having an associated pair of switch modules 1502. Each blade in a blade chassis can access each of the switch modules via internal ports on the switch modules. Each switch module also typically has a small number of external ports for connection to external devices and switches. In this embodiment, one of the switch modules in a chassis is used to connect the blades to an external storage network 1504. The other switch module in a chassis is used to connect the blades to the switch fabric 1500. Dashed lines in FIG. 15 represent paths through the switch fabric. The switch fabric could be replaced in other embodiments with a different type of external data network or other non-storage network.

Three of the external ports of a given switch module 1502 on the switch fabric side of the corresponding compute server 212 are connected, via respective paths through the switch fabric, to Internet 108, an access network terminator 1510, and one of the VOD servers 216. In this embodiment, the VOD servers 216 themselves form a cluster that is interconnected using a physically separate network 1512, which may be, for example, an Infiniband network.

Each of the solid lines labeled by a letter in FIG. 15 represents one or more physical links. In some cases those links are aggregated, while in others they are not. For ease of discussion we will omit the aggregation details and simply refer to each line as "a link." Link A enables the VPC to access the Internet 108. Link B carries TP (the TC protocol); links C and D carry the VOD and non-VOD portions of that protocol, respectively. Links E and F enable the VPCs to access the virtual disks. Links G and H enable the VPCs to control the VOD servers. Link I enables the SP to download video into the VOD servers. Link J enables the SP to migrate virtual disks through the backend network. And finally link K is the uplink to the Internet.

A. Analysis

We now roughly analyze the worst-case load on each of these links. Because the usage of these links is not symmetric, we will analyze each direction independently. We emphasize that this analysis is only approximate, presented by way of example, and is based on a number of simplifying assumptions in an illustrative embodiment. These assumptions need not apply in other embodiments of the invention, and the associated analysis should not be construed as limiting the scope of the invention in any way. Table II summarizes the rough estimates generated by this analysis.

TABLE II

ESTIMATED WORST-CASE LOADS. (N = NUMBER OF HOMES SERVED BY ATTACHED ACCESS-NETWORK TERMINATOR.)

| Link | Direction | Load (Gb/s) |
|---|---|---|
| A | downstream | 18 or higher |
|   | upstream | 2 |
| B | downstream | 0.09 N |
|   | upstream | 0.03 N |
| C | away from VOD server | 4 |
|   | toward VOD server | negligible |
| D | downstream | 22 |
|   | upstream | 7 |
| E | away from compute server | 20 |
|   | toward compute server | 20 |
| F | away from storage array | 30 |
|   | toward storage array | 30 |
| G | away from compute server | Negligible |
|   | toward compute server | Negligible |
| H | away from VOD server | Negligible |
|   | toward VOD server | Negligible |
| I | away from VOD server | Negligible |
|   | toward VOD server | SP-determined |
| J | downstream | Unknown |
|   | upstream | Unknown |

Throughout the following we will assume a relatively large CO serving 10,000 homes, each of which has three VPCs (two for the parents and one for the children).

Link A: This link must provide enough downstream bandwidth to satisfy all the homes that are being served by the attached compute server. A typical model of blade chassis suitable for use in a CO environment can hold up to 12 blades, each blade having two dual-core CPUs. If we assume 30 VPCs per core, then a single chassis can serve 720 VPCs in 240 homes.

To estimate how much bandwidth is needed per home, consider the following. In Verizon's current FiOS deployment, each home gets an average of 19 Mb/s for Internet access (plus additional bandwidth for non-Internet delivered video). But FiOS uses BPON; if GPON were deployed, the per-home rate would increase to 75 Mb/s. In some areas (such as Hong Kong and North Kansas City, Mo.), access networks are now delivering a 1 Gb/s pipe to each residence. Whether the SP can actually fill that pipe with 1 Gb/s of traffic is a separate issue. It is reasonable to expect that SPs will want the system to support at least 100 Mb/s per home. However, the bandwidth "to the home" does not need to be delivered all the way to the home itself; delivering it to the compute server is sufficient.

Because many homes can be served by a single compute server, the SP can exploit statistical multiplexing to reduce the bandwidth requirement on link A. Assuming a 25% statistical multiplexing gain on link A, the resulting downstream bandwidth requirement on link A is 18 Gb/s to support 100 Mb/s per home.

Now consider the upstream direction. Although it is true that some of the newest access-network deployments deliver 1 Gb/s per home in the upstream direction, we believe that it is less likely that an SP will require such high upstream speeds from system 100. A suitable conservative assumption is that 10 Mb/s is sufficient. Again assuming a 25% statistical multiplexing gain on link A, the resulting upstream bandwidth requirement on link A is 2 Gb/s.

Link B: This link must provide enough bandwidth to carry TP for all the VPCs served by the attached access-network terminator. Recall that in the downstream direction TP comprises an intermix of audio, video, and data streams. The bandwidth for audio is negligible. For video, the downstream is an intermix of zero or more streams from the compute server and zero or more from the VOD server. In the worst case, an adversarial user could create many streams consuming an arbitrarily large amount of bandwidth. However, the system is preferably designed to prevent such adversarial use. The definition of "adversarial" will depend on the bandwidth available in the access network. Users with a lot of access-network bandwidth might be allowed to watch multiple non-interactive or VOD streams simultaneously, whereas users with less bandwidth might be allowed at most one noninteractive stream or one VOD stream, but not both at the same time.

The noninteractive and VOD streams may use H.264 encoding. Although the maximum bitrate of this encoding depends on the encoder settings, in practice a bitrate of 10 Mb/s is expected to suffice. The interactive streams may be encoded using a traditional TC protocol whose bitrate may be at least an order of magnitude lower, say 1 Mb/s. If we assume that a VPC is allowed at most two simultaneous noninteractive or VOD streams, then each VPC requires at most 21 Mb/s for video.

For data, downstream bandwidth is needed on link B only for sending to local USB devices. A reasonable assumption is that 10 Mb/s per VPC is sufficient.

Thus, the total downstream bandwidth on link B is 93 Mb/s times the number of homes served by the attached terminator. The number of homes served by that terminator is a function of the access-network technology. For example, a 2.4 Gb/s GPON has sufficient bandwidth to serve 25 homes configured as we have described, whereas a 10 Gb/s PON has enough bandwidth for 107.

Now consider the upstream direction. Audio is again negligible, and as explained previously what little video there is can be considered a special case of data. For data, upstream bandwidth is needed on link B only for sending from local USB devices, and an estimate of 10 Mb/s will again be used. Thus, the total upstream bandwidth on link B is 30 Mb/s times the number of homes served by the attached terminator.

Link C: This link is most heavily loaded when the attached VOD server is delivering video at its maximum total rate, which for current high end VOD servers is 3.75 Gb/s. The load toward the server comprises primarily acknowledgments and is negligible.

Link D: The analysis for this link is similar to that for link B above. In the downstream direction, link D in the worst case carries the 21 Mb/s of video and 10 Mb/s of data for every VPC served by the attached compute server. With a single chassis serving 720 VPCs, that is 22 Gb/s. In the upstream direction, link D carries the 10 Mb/s of data for every VPC, for a total of 7.2 Gb/s.

Link E: The load on this link depends on what the VPCs on the attached compute server are doing. For example, if every one of the 720 VPCs is running an application that does nothing but read from its virtual disk, then the load on link E could easily top 20 Gb/s in each direction, assuming that all the affected subsystems in the chassis could handle that load. The actual maximum load that can be generated by a single chassis may be determined in order to provide a more accurate estimate.

Link F: This link is most heavily loaded when the attached storage array is reading and writing data at its maximum total rate, which for current high end storage arrays can be as high as 30 Gb/s.

Links G and H: Traffic on these links generally comprises infrequent control messages, and hence the load is negligible.

Link I: This link, which is used only for downloads into the VOD server, can be loaded as much or as little as the SP likes in the downstream. In the upstream the load is negligible.

Link J: The load on this link is a function of the number of VPCs that are at any given time moving between COs, and the behavior of the distributed file system used to trickle virtual disks between COs. The worst-case load on this link has not been determined.

B. Commentary

An important thing to observe in Table II is the high downstream bandwidth on links A and D—18 Gb/s or higher and 22 Gb/s, respectively. These rates cannot be supported by 1 Gb/s switch modules even with link aggregation, because we would need 40 ports, and that many ports typically do not fit on a single module. Instead, we utilize a 10 Gb/s module and aggregate two of its ports for link A and three for link D. Existing 10 Gb/s switch modules provide up to six external ports, which fortunately leaves exactly one port for link G.

If the load analysis above turns out to be slightly off and the links A and D actually need a total of more than five switch ports, and no existing switch module will suffice, it may be necessary to reduce the bandwidth required for links A and D. There are two ways to do that. The first way is to reduce the number of VPCs running in the chassis; this change would reduce the bandwidth on both links. The drawback is that the CO will then need more chassis (and more floor space) to serve the required number of homes. The second way is to tighten the TP video encoding; this change would reduce the bandwidth on link D.

Because logical links A and D are implemented using 10 Gb/s physical links, the switch fabric 1500 in FIG. 15 is implemented using a 10 Gb/s switch fabric. Further, that fabric is configured to isolate the internal paths as shown in FIG. 15. Although it might be possible to construct such a fabric by hand using a collection of individual 10 Gb/s switches, a better approach would be to use a distributed switch that provides the ability to dynamically isolate internal paths.

Existing 10 Gb/s distributed switches generally do not provide 1 Gb/s ports. Also, existing high-end VOD servers generally do not provide 10 Gb/s ports. Therefore, to connect the VOD servers to the distributed switch, a 1 G-to-10 G converter (not shown in FIG. 15) may be used.

If the distributed switch is sufficiently flexible, then the storage network could be implemented using the same distributed switch as the data network. Storage arrays that provide Gb/s ports are known, and may be used in a given embodiment.

It should again be emphasized that the embodiments described above are presented by way of illustrative example only. Other embodiments may use different communication system configurations, different types of COs, networks, servers and other system elements, different communication protocols, and so on, depending on the needs of the particular VPC implementation.

For example, although the illustrative embodiments utilize physically separate compute and storage servers implemented in a given CO, other embodiments may combine two or more such servers into a single server or other system processing element. Also, the particular manner in which the various CO processing elements are interconnected within a given CO may vary in other embodiments. Similarly, the particular techniques used to interconnect multiple COs for purposes of making a given VPC available at multiple locations can be varied in other embodiments.

It should also be noted that the particular assumptions, limitations, and restrictions discussed in the context of describing the illustrative embodiments should not be construed as requirements of the invention. The invention can be implemented in other embodiments in which these particular assumptions, limitations, and restrictions do not apply.

These and numerous other alternative embodiments within the scope of the appended claims will be readily apparent to those skilled in the art.

What is claimed is:

1. A method of implementing virtual personal computers in a communication system, the communication system comprising a plurality of central offices each of which communicates with a plurality of client devices over a corresponding access network, the method comprising the steps of:

providing in a given one of the central offices at least one compute server and at least one storage server;

configuring a given one of the virtual personal computers by allocating physical processing resources of the compute server and physical storage resources of the storage server to that virtual personal computer; and providing access to the given virtual personal computer to a user via a corresponding one of the client devices;

wherein the compute server comprises a plurality of interconnectable graphics processing unit (GPU) hardware subcomponents, the compute server configuring a particular GPU processing pipeline for the given virtual personal computer from selected ones of said subcomponents; and wherein a frame buffer associated with the GPU processing pipeline is allocated such that it utilizes an address space of a processor core that runs a corresponding virtual machine, but is physically located internal to an integrated circuit comprising at least a portion of the GPU hardware subcomponents.

2. The method of claim 1 further including the step of dynamically reconfiguring the given virtual personal computer by altering the allocation of at least one of the physical processing resources and the physical storage resources to the given virtual personal computer responsive to particular applications selected by the user to run on the given virtual personal computer.

3. The method of claim 1 further comprising the step of migrating the given virtual personal computer from the given central office to another central office responsive to the user attempting to access the virtual personal computer from a client device served by the other central office.

4. The method of claim 3 wherein the migrating step is implemented by communicating virtual machine and virtual disk drive information characterizing the virtual personal computer from the given central office to the other central office over a back-end network that interconnects the central offices.

5. The method of claim 1 wherein the virtual personal computers run respective operating systems, each of the operating systems being configured to dynamically schedule threads of an associated virtual machine onto one or more virtual processor cores, and further wherein a virtual machine monitor running on the compute server dynamically schedules the virtual processor cores onto particular physical cores of the compute server.

6. The method of claim 1 wherein the storage server provides virtual disk drives for respective ones of the virtual personal computers.

7. The method of claim 1 wherein the given virtual personal computer is operative in an automatic reconfiguration mode in which reconfiguration of the virtual personal computer occurs without requiring specific user input and in a manual reconfiguration mode in which a user specifies a particular manner in which the virtual personal computer is to be reconfigured by entry of one or more commands via an interface of the client device.

8. The method of claim 1 wherein the compute server implements hardware-mediated transfer functionality in which color buffer contents are read out and packetized for delivery to the client device over the access network.

9. The method of claim 1 wherein the compute server is further operative to dynamically reconfigure one or more hardware elements of the client device.

10. A non-transitory processor-readable storage medium containing executable program code which when executed by a processor of the given central office performs the steps of configuring the given virtual personal computer and providing access to the given virtual personal computer as set forth in claim 1.

11. The method of claim 8, wherein the color buffer contents comprise pixels of an image to be displayed by the client device.

12. A method of implementing virtual personal computers in a communication system, the communication system comprising a plurality of central offices each of which communicates with a plurality of client devices over a corresponding access network, the method comprising the steps of:
    providing in a given one of the central offices at least one compute server and at least one storage server;
    configuring a given one of the virtual personal computers by allocating physical processing resources of the compute server and physical storage resources of the storage server to that virtual personal computer; and
    providing access to the given virtual personal computer to a user via a corresponding one of the client devices;
    wherein the compute server implements hardware-mediated transfer functionality in which color buffer contents are read out and packetized for delivery to the client device over the access network; and
    wherein the hardware-mediated transfer functionality comprises an integrated circuit configured to simultaneously read a plurality of color buffers, the integrated circuit being further configured to compress, encrypt, and packetize contents read from the color buffers, using respective hardware processing elements, and to transmit the resulting packets onto a network interface.

13. A method of implementing virtual personal computers in a communication system, the communication system comprising a plurality of central offices each of which communicates with a plurality of client devices over a corresponding access network, the method comprising the steps of:
    providing in a given one of the central offices at least one compute server and at least one storage server;
    configuring a given one of the virtual personal computers by allocating physical processing resources of the compute server and physical storage resources of the storage server to that virtual personal computer; and
    providing access to the given virtual personal computer to a user via a corresponding one of the client devices;
    wherein the compute server in processing video display information for the given virtual personal computer performs the following steps to encode interactive regions of the video display information with an interactive coding and to encode remaining regions of the video display information with a noninteractive encoding:
    identifying boundaries of the interactive and noninteractive regions;
    selecting encoders for use with respective ones of the regions;
    routing pixels for each region to the selected encoder; and
    sending resulting encoded streams to the client device via the access network along with information specifying an associated encoder and region for each such stream.

14. An apparatus comprising:
    a central office comprising at least one compute server and at least one storage server;
    the compute and storage servers implementing a plurality of virtual personal computers;
    wherein the central office is operative to configure a given one of the virtual personal computers by allocating physical processing resources of the compute server and physical storage resources of the storage server to that virtual personal computer, and to provide access to the given virtual personal computer to a user via a corresponding client device;
    wherein the central office is within a communication system comprising a plurality of central offices each of which communicates with a plurality of client devices over a corresponding access network;
    wherein the compute server comprises a plurality of interconnectable graphics processing unit (GPU) hardware subcomponents, the compute server configuring a particular GPU processing pipeline for the given virtual personal computer from selected ones of said subcomponents; and
    wherein a frame buffer associated with the GPU processing pipeline is allocated such that it utilizes an address space of a processor core that runs a corresponding virtual machine, but is physically located internal to an integrated circuit comprising at least a portion of the GPU hardware subcomponents.

15. The apparatus of claim 14 wherein the central office further comprises a distributed switch fabric configured to connect the compute server with access network terminations of the central office.

16. The apparatus of claim 14 wherein the compute server comprises a blade chassis having a plurality of associated switch modules, wherein each of a plurality of blades of the blade chassis can access each of the switch modules via internal ports on the switch modules.

17. The apparatus of claim 16 wherein the compute server is coupled to the storage server via an external port on one of the switch modules and is coupled to a distributed switch fabric via an external port on another one of the switch modules.

18. The apparatus of claim 14 wherein the virtual personal computers run respective operating systems, each of the operating systems being configured to dynamically schedule threads of an associated virtual machine onto one or more virtual processor cores, and further wherein a virtual machine monitor running on the compute server dynamically schedules the virtual processor cores onto particular physical cores of the compute server.

19. The apparatus of claim 14 wherein the given virtual personal computer is operative in an automatic reconfiguration mode in which reconfiguration of the virtual personal computer occurs without requiring specific user input and in a manual reconfiguration mode in which a user specifies a particular manner in which the virtual personal computer is to be reconfigured by entry of one or more commands via an interface of the client device.

20. A communication system, comprising:
a plurality of central offices; and
access networks associated with respective ones of the central offices;
wherein each of the central offices communicates with a plurality of client devices over a corresponding one of the access networks;
each of the central offices comprising at least one compute server and at least one storage server, adapted to implement a plurality of virtual personal computers;
wherein a given one of the central offices is operative to configure a given one of the virtual personal computers by allocating physical processing resources of the compute server and physical storage resources of the storage server to that virtual personal computer, and to provide access to the given virtual personal computer to a user via a corresponding client device;
wherein the compute server comprises a plurality of interconnectable graphics processing unit (GPU) hardware subcomponents, the compute server configuring a particular GPU processing pipeline for the given virtual personal computer from selected ones of said subcomponents; and
wherein a frame buffer associated with the GPU processing pipeline is allocated such that it utilizes an address space of a processor core that runs a corresponding virtual machine, but is physically located internal to an integrated circuit comprising at least a portion of the GPU hardware subcomponents.

21. The communication system of claim 20 wherein the plurality of central offices are interconnected with one another by a back-end network, and further wherein the given virtual personal computer is migrated from the given central office to another central office responsive to the user attempting to access the given virtual personal computer from a client device served by the other central office.

\* \* \* \* \*